United States Patent
Guo et al.

(10) Patent No.: US 11,834,370 B2
(45) Date of Patent: *Dec. 5, 2023

(54) COLORED GLASS ARTICLES HAVING IMPROVED MECHANICAL DURABILITY

(71) Applicant: CORNING INCORPORATED, Corning, NY (US)

(72) Inventors: Xiaoju Guo, Pittsford, NY (US); Karl William Koch, III, Elmira, NY (US); Liping Xiong Smith, Painted Post, NY (US); Nicole Taylor Wiles, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,090

(22) Filed: Jan. 4, 2023

(65) Prior Publication Data

US 2023/0192532 A1 Jun. 22, 2023

Related U.S. Application Data

(63) Continuation of application No. 17/843,096, filed on Jun. 17, 2022.

(Continued)

(51) Int. Cl.
*C03C 4/02* (2006.01)
*C03C 3/091* (2006.01)
(Continued)

(52) U.S. Cl.
CPC ............... *C03C 4/02* (2013.01); *C03C 3/091* (2013.01); *C03C 3/093* (2013.01); *C03C 3/095* (2013.01);
(Continued)

(58) Field of Classification Search
CPC ........... C03C 4/02; C03C 3/091; C03C 3/093; C03C 3/095; C03C 21/00
(Continued)

(56) References Cited

U.S. PATENT DOCUMENTS 2,418,605 A 4/1947 Shepherd et al.
3,524,737 A 8/1970 Doyle et al.
(Continued)

FOREIGN PATENT DOCUMENTS

CN 102960081 A 3/2013
CN 104640820 A 5/2015
(Continued)

OTHER PUBLICATIONS

"Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992),".

(Continued)

*Primary Examiner* — Tahseen Khan
(74) *Attorney, Agent, or Firm* — Russell S. Magaziner

(57) ABSTRACT

A glass composition includes greater than or equal to 50 mol % and less than or equal to 70 mol % $SiO_2$; greater than or equal to 10 mol % and less than or equal to 20 mol % $Al_2O_3$; greater than or equal to 1 mol % and less than or equal to 10 mol % $B_2O_3$; greater than or equal to 7 mol % and less than or equal to 14 mol % $Li_2O$; greater than 0 mol % and less than or equal to 8 mol % $Na_2O$; greater than 0 mol % and less than or equal to 1 mol % $K_2O$; greater than or equal to 0 mol % and less than or equal to 7 mol % CaO; greater than or equal to 0 mol % and less than or equal to 8 mol % MgO; and greater than or equal to 0 mol % and less than or equal to 8 mol % ZnO. $R_2O+R'O$ is less than or equal to 25 mol (Continued)

%, wherein $R_2O$ is the sum of $Li_2O$, $Na_2O$, and $K_2O$ and $R'O$ is the sum of CaO, MgO, and ZnO. The glass composition includes at least one of $NiO+Co_3O_4+Cr_2O_3+CuO$ is greater than or equal to 0.001 mol %, $CeO_2$ is greater than or equal to 0.1 mol %, and $TiO_2$ is greater than or equal to 0.1 mol %.

24 Claims, 5 Drawing Sheets

Related U.S. Application Data

(60) Provisional application No. 63/318,553, filed on Mar. 10, 2022, provisional application No. 63/212,179, filed on Jun. 18, 2021, provisional application No. 63/347,095, filed on May 31, 2022, provisional application No. 63/347,201, filed on May 31, 2022.

(51) Int. Cl.
*C03C 3/095* (2006.01)
*C03C 3/093* (2006.01)
*C03C 21/00* (2006.01)

(52) U.S. Cl.
CPC ........ *C03C 21/002* (2013.01); *C03C 2204/00* (2013.01)

(58) Field of Classification Search
USPC .......................................................... 428/220
See application file for complete search history.

(56) References Cited

U.S. PATENT DOCUMENTS

| | | |
|---|---|---|
| 3,751,238 A | 8/1973 | Grego et al. |
| 3,778,335 A | 12/1973 | Boyd |
| 3,788,865 A | 1/1974 | Busdiecker et al. |
| 3,902,881 A | 9/1975 | Pirooz |
| 4,086,089 A | 4/1978 | Seward, III et al. |
| 4,102,664 A | 7/1978 | Dumbaugh, Jr. |
| 4,240,836 A | 12/1980 | Borrelli et al. |
| 4,298,389 A | 11/1981 | Johnson et al. |
| 4,786,305 A | 11/1988 | Ball et al. |
| 4,814,297 A | 3/1989 | Beall et al. |
| 6,333,286 B1 | 12/2001 | Kurachi et al. |
| 6,340,647 B1 | 1/2002 | Koyama et al. |
| 6,365,534 B1 | 4/2002 | Koyama et al. |
| 6,376,403 B1 | 4/2002 | Koyama et al. |
| 6,532,770 B2 | 3/2003 | Uhlik et al. |
| 6,547,980 B1 | 4/2003 | Kurachi et al. |
| 7,192,898 B2 | 3/2007 | Mori et al. |
| 7,659,221 B2 | 2/2010 | Arbab et al. |
| 7,666,511 B2 | 2/2010 | Ellison et al. |
| 8,127,571 B2 | 3/2012 | Martin et al. |
| 8,168,313 B2 | 5/2012 | Endo et al. |
| 8,232,218 B2 | 7/2012 | Dejneka et al. |
| 8,455,066 B2 | 6/2013 | Heithoff et al. |
| 8,962,503 B2 | 2/2015 | Nagai et al. |
| 9,053,734 B2 | 6/2015 | Kajita et al. |
| 9,156,725 B2 | 10/2015 | Dejneka et al. |
| 9,199,876 B2 | 12/2015 | Wang et al. |
| 9,284,215 B2 | 3/2016 | Yamamoto et al. |
| 9,403,716 B2 | 8/2016 | Dejneka et al. |
| 9,595,960 B2 | 3/2017 | Wilford |
| 9,701,570 B2 | 7/2017 | Mauro et al. |
| 9,790,124 B2 | 10/2017 | Dejneka et al. |
| 9,963,378 B2 | 5/2018 | Yamamoto |
| 10,081,568 B2 | 9/2018 | Plevacova et al. |
| 10,246,371 B1 | 4/2019 | Dejneka et al. |
| 10,577,275 B2 | 3/2020 | Lambricht et al. |
| 10,626,043 B2 | 4/2020 | Lambricht et al. |
| 10,656,454 B2 | 5/2020 | Bazemore et al. |
| 11,059,739 B2 | 7/2021 | Wolfinger et al. |
| 11,072,557 B2 | 7/2021 | Weiss et al. |
| 11,161,768 B2 | 11/2021 | Lambricht et al. |
| 11,192,817 B2 | 12/2021 | Ono |
| 11,267,748 B2 | 3/2022 | Siebers et al. |
| 11,390,560 B2 | 7/2022 | Murayama et al. |
| 11,420,898 B2 | 8/2022 | He et al. |
| 11,560,329 B1 | 1/2023 | Guo et al. |
| 2003/0210535 A1 | 11/2003 | Gaides |
| 2007/0158317 A1 | 7/2007 | Brix et al. |
| 2012/0135848 A1 | 5/2012 | Beall et al. |
| 2013/0128434 A1 | 5/2013 | Yamamoto et al. |
| 2013/0136909 A1 | 5/2013 | Mauro et al. |
| 2014/0066285 A1 | 3/2014 | Beall et al. |
| 2014/0087194 A1 | 3/2014 | Dejneka et al. |
| 2014/0243183 A1 | 8/2014 | Beall et al. |
| 2014/0285956 A1 | 9/2014 | Russell-Clarke et al. |
| 2015/0064474 A1 | 3/2015 | Dejneka et al. |
| 2015/0166400 A1 | 6/2015 | Yamamoto |
| 2015/0166403 A1 | 6/2015 | Yamamoto |
| 2015/0368149 A1 | 12/2015 | Guo et al. |
| 2016/0090321 A1 | 3/2016 | Bookbinder et al. |
| 2016/0168023 A1 | 6/2016 | Baum et al. |
| 2016/0326045 A1 | 11/2016 | Li |
| 2017/0166478 A1 | 6/2017 | Gross et al. |
| 2017/0184764 A1 | 6/2017 | Matsuyuki et al. |
| 2017/0217825 A1 | 8/2017 | Hasegawa et al. |
| 2017/0291849 A1 | 10/2017 | Dejneka et al. |
| 2017/0305786 A1 | 10/2017 | Roussev et al. |
| 2017/0355636 A1 | 12/2017 | Borrelli et al. |
| 2018/0148370 A1 | 5/2018 | Baker et al. |
| 2018/0162768 A1 | 6/2018 | Boek et al. |
| 2018/0362390 A1 | 12/2018 | Claireaux et al. |
| 2019/0071345 A1 | 3/2019 | Mauro et al. |
| 2019/0177206 A1 | 6/2019 | Dejneka et al. |
| 2019/0177209 A1 | 6/2019 | Dejneka et al. |
| 2019/0263713 A1 | 8/2019 | Murayama et al. |
| 2019/0300422 A1 | 10/2019 | Guo et al. |
| 2020/0140322 A1 | 5/2020 | Comte et al. |
| 2020/0189962 A1* | 6/2020 | Dejneka .................. C03C 3/091 |
| 2020/0377404 A1 | 12/2020 | Beall et al. |
| 2021/0155530 A1 | 5/2021 | Cui et al. |
| 2021/0155531 A1 | 5/2021 | Dejneka et al. |
| 2022/0135466 A1 | 5/2022 | Maeda et al. |
| 2022/0371942 A1 | 11/2022 | Ping et al. |
| 2022/0402805 A1 | 12/2022 | Guo et al. |
| 2022/0402808 A1* | 12/2022 | Guo ........................ C03C 3/091 |
| 2023/0056403 A1 | 2/2023 | Nguyen et al. |
| 2023/0159383 A1 | 5/2023 | Leukel et al. |

FOREIGN PATENT DOCUMENTS

| | | |
|---|---|---|
| CN | 107935410 A | 4/2018 |
| CN | 108715510 A | 10/2018 |
| CN | 109970362 A | 7/2019 |
| CN | 110216384 A | 9/2019 |
| CN | 110255896 A | 9/2019 |
| CN | 110615610 A | 12/2019 |
| CN | 113845302 A | 12/2021 |
| DE | 10141666 A1 | 3/2003 |
| EP | 1593658 A1 | 11/2005 |
| EP | 2764320 A2 | 8/2014 |
| EP | 3390311 B1 | 8/2019 |
| JP | 55-045501 A | 3/1980 |
| JP | 63-166736 A | 7/1988 |
| JP | 2000-203872 A | 7/2000 |
| JP | 2003-306348 A | 10/2003 |
| JP | 4192232 B2 | 12/2008 |
| JP | 4303999 B2 | 7/2009 |
| JP | 7136100 B2 | 9/2022 |
| RU | 2645687 C1 | 2/2018 |
| WO | 2013/050727 A1 | 7/2013 |
| WO | 2013/099994 A1 | 7/2013 |
| WO | 2017/218468 A1 | 12/2017 |
| WO | 2019/064280 A1 | 4/2019 |
| WO | 2019/083937 A2 | 5/2019 |
| WO | 2019/127818 A1 | 7/2019 |

(56) References Cited

FOREIGN PATENT DOCUMENTS

| WO | 2021/010376 A1 | 1/2021 |
| WO | 2021/136726 A1 | 7/2021 |

OTHER PUBLICATIONS

"Infrared Sensors Market Set to Show Upsurge With Rise in Home Automated Products—IndustryARC Analysis", 2017, Retreived from: https://globenewswire.com/news-release/2017/03/21/942857/0/en/Infrared-Sensors-Market-Set-To-Show-Upsurge-With-Rise-In-Home-Automated-Products-IndustryARC-Analysis.html, Retrieved on Jan. 16, 2023.

"Near Infrared Imaging Market—Global Forecast to 2020", Fast Market Research, 2022, Retreived from: http://www.sbwire.com/press-releases/just-published-near-infrared-imaging-market-global-672492.htm, Retreived on Jan. 16, 2023.

"Plexiglass Acrylic Sheets", Retrieved from: http://www.eplastics.com/Plastic/Plexiglass_Acrylic_Sheet_Infrared_Transmitting?gclid=EAlalQobChMIsL6mu7jp2AIVxRuBCh1EIQyVEAYYASABEgLs_fD_BWE, Retrieved on: Jan. 12, 2023.

"Reddy, K. P. R. et al, "Fracture Toughness Measurement of Glass and Ceramic Materials Using Chevron-Notched Specimens," J. Am. Ceram. Soc., 71 [6], C-310-C-313 (1988)".

Alan R. Frank, "Near-Infrared Image Sensor Targets IoT Camera Market", Mar. 2016, Retrieved from: http://electronics360.globalspec.com/article/6487/near-infrared-image-sensor-targets-iot-camera-market, Retrieve on: Jan. 12, 2023.

ASTM C1351M-96(2017) "Standard Test Method for Measurement of Viscosity of Glass Between 104 Pas and 108 Pas by Viscous Compression of a Solid Right Cylinder".

ASTM C829-81 (2015), titled "Standard Practice for Measurement of L-iquidus Temperature of Glass by the Gradient Furnace Method."

ASTM E228-85 (1989), "Standard Test Method for Linear Thermal Expansion of Solid Materials With a Vitreous Silica Dilatometer".

ASTM standard C770-16, entitled "Standard Test Method for Measurement of Glass Stress-Optical Coefficient,".

David Ashkenasi, Andreas Lemke, "Picosecond laser-induced color centers in glass optics", J. Laser Appl. 23, 012007 (2011).

Hirao et al., "Crystallization effect on non-linear optical response of silicate glass and glass-ceramics containing gold nanoparticles." Journal of non-crystalline solids, vol. 290, No. 1, 2001, pp. 49-56.

Llordes, et al., "Tunable near-infrared and visible-light transmittance in nanocrystals-in-glass composites", Nat. Lett., vol. 500, 2013, pp. 323-327.

Sasai, Jun, and Kazuyuki Hirao. "Crystallization effect on non-linear optical response of silicate glass and glass-ceramics containing gold nanoparticles." Journal of non-crystalline solids 290, No. 1 (2001): 49-56.

Sheng, J., K. Kadono, and T. Yazawa. "Easily recyclable coloured glass by x-ray irradiation induced coloration." Glass technology 43, No. 6 (2002): 238-244.

Stookey, S. D. "Coloration of glass by gold, silver, and copper." Journal of the American Ceramic Society, vol. 32, No. 8, 1949, pp. 246-249.

Yamashita, Masaru, Zhidong Yao, Yoshinobu Matsumoto, Yasushi Utagawa, Kohei Kadono, and Tetsuo Yazawa. "X-ray irradiation-induced coloration of manganese in soda-lime silicate glass." Journal of non-crystalline solids 333, No. 1 (2004): 37-43.

Yazawa, et al., "Nanosized gold clusters formation in selected areas of soda-lime silicate glass." Journal of non-crystalline solids, vol. 324, No. 3, 2003, pp. 295-299.

International Search Report and Written Opinion of the International Searching Authority; PCT/US2022/050344; dated Mar. 31, 2023, 11 pages; European Patent Office.

* cited by examiner

\# COLORED GLASS ARTICLES HAVING IMPROVED MECHANICAL DURABILITY

This application is a continuation of U.S. application Ser. No. 17/843,096, filed on Jun. 17, 2022, which claims the benefit of U. S. Provisional Application Ser. No. 63/318,553 filed on Mar. 10, 2022, U.S. Provisional Application Ser. No. 63/212,179 filed on Jun. 18, 2021, U.S. Provisional Application Ser. No. 63/347,095 filed on May 31, 2022, U.S. Provisional Application Ser. No. 63/347,201 filed on May 31, 2022, the content of each of which are relied upon and incorporated herein by reference in their entirety.

FIELD

The present specification generally relates to glass compositions and glass articles and, in particular, to glass compositions and ion-exchangeable, colored glass articles formed therefrom.

TECHNICAL BACKGROUND

Aluminosilicate glass articles may exhibit superior ion-exchangeability and drop performance. Various industries, including the consumer electronics industry, desire colored materials with the same or similar strength and fracture toughness properties. However, simply including colorants in conventional aluminosilicate glass compositions may not produce the desired color and/or result in colored glass articles suitable for use in electronic devices transmitting and/or receiving high frequencies (e.g., frequencies of fifth generation (5G) wireless).

Accordingly, a need exists for an alternative colored glass articles that minimize disruption of transmitting and/or receiving of high frequency while providing the high strength and fracture toughness necessary for use in electronic devices.

SUMMARY

According to a first aspect A1, a glass composition includes greater than or equal to 50 mol % and less than or equal to 70 mol % $SiO_2$; greater than or equal to 10 mol % and less than or equal to 20 mol % $Al_2O_3$; greater than or equal to 1 mol % and less than or equal to 10 mol % $B_2O_3$; greater than or equal to 7 mol % and less than or equal to 14 mol % $Li_2O$; greater than 0 mol % and less than or equal to 8 mol % $Na_2O$; greater than 0 mol % and less than or equal to 1 mol % $K_2O$; greater than or equal to 0 mol % and less than or equal to 7 mol % CaO; greater than or equal to 0 mol % and less than or equal to 8 mol % MgO; and greater than or equal to 0 mol % and less than or equal to 8 mol % ZnO. $R_2O+R'O$ is less than or equal to 25 mol %, wherein $R_2O$ is the sum of $Li_2O$, $Na_2O$, and $K_2O$ and R'O is the sum of CaO, MgO, and ZnO. The glass composition includes at least one of $NiO+Co_3O_4+Cr_2O_3+CuO$ is greater than or equal to 0.001 mol %, $CeO_2$ is greater than or equal to 0.1 mol %, and $TiO_2$ is greater than or equal to 0.1 mol %.

A second aspect A2 includes the glass composition according to the first aspect A1, wherein $NiO+Co_3O_4+Cr_2O_3+CuO$ is greater than or equal to 0.001 mol % and less than or equal to 3 mol %.

A third aspect A3 includes the glass composition according to the first aspect A1, wherein $CeO_2$ is greater than or equal to 0.1 mol % and less than or equal to 2 mol %.

A fourth aspect A4 includes the glass composition according to the first aspect A1, wherein $TiO_2$ is greater than or equal to 0.1 mol % and less than or equal to 2 mol %.

A fifth aspect A5 includes the glass composition according to the first aspect A1, wherein $NiO+Co_3O_4+Cr_2O_3+CuO+CeO_2+TiO_2$ is greater than or equal to 0.001 mol % and less than or equal to 10 mol %.

A sixth aspect A6 includes the glass composition according to any one of the first aspect A1 to the fifth aspect A5, wherein $R_2O+R'O$ is greater than or equal to 7 mol % and less than or equal to 25 mol %.

A seventh aspect A7 includes the glass composition according to any one of the first aspect A1 to the sixth aspect A6, wherein $R_2O$ is greater than or equal to 7 mol % and less than or equal to 25 mol %.

An eighth aspect A8 includes the glass composition according to any one of the first aspect A1 to the seventh aspect A7, wherein R'O is greater than or equal to 0 mol % and less than or equal to 12 mol %.

A ninth aspect A9 includes the glass composition according to any one of the first aspect A1 to the eighth aspect A8, wherein $3.802946+0.01747*B_2O_3+0.058769*Al_2O_3+0.080876*Li_2O+0.148433*Na_2O+0.153264*K_2O+0.045179*MgO+0.080113*CaO$ is less than or equal to 6.8.

A tenth aspect A10 includes the glass composition according to any one of the first aspect A1 to the ninth aspect A9, wherein $R_2O-Al_2O_3$ is greater than or equal to $-8$ mol % and less than or equal to 4 mol %.

An eleventh aspect A11 includes the glass composition according to any one of the first aspect A1 to the tenth aspect A10, wherein the glass composition comprises greater than or equal to 7.5 mol % and less than or equal to 13.5 mol % $Li_2O$.

A twelfth aspect A12 includes the glass composition according to any one of the first aspect A1 to the eleventh aspect A11, wherein the glass composition comprises greater than or equal to 0.1 mol % and less than or equal to 7 mol % $Na_2O$.

A thirteenth aspect A13 includes the glass composition according to any one of the first aspect A1 to the twelfth aspect A12, wherein the glass composition comprises greater than or equal to 0.1 mol % and less than or equal to 0.7 mol % $K_2O$.

A fourteenth aspect A14 includes the glass composition according to any one of the first aspect A1 to the thirteenth aspect A13, wherein the glass composition comprises greater than or equal to 0.25 mol % and less than or equal to 6.5 mol % CaO.

A fifteenth aspect A15 includes the glass composition according to any one of the first aspect A1 to the fourteenth aspect A14, wherein the glass composition comprises greater than or equal to 0.25 mol % and less than or equal to 7 mol % MgO.

A sixteenth aspect A16 includes the glass composition according to any one of the first aspect A1 to the fifteenth aspect A15, wherein the glass composition comprises greater than or equal to 0.5 mol % and less than or equal to 7 mol % ZnO.

A seventeenth aspect A17 includes the glass composition according to any one of the first aspect A1 to the sixteenth aspect A16, wherein the glass composition comprises greater than or equal to 0.01 mol % and less than or equal to 1 mol % $Fe_2O_3$.

An eighteenth aspect A18 includes the glass composition according to any one of the first aspect A1 to the sixteenth aspect A16, wherein the glass composition comprises greater than or equal to 0.001 mol % and less than or equal to 0.5 mol % $Fe_2O_3$.

A nineteenth aspect A19 includes the glass composition according to any one of the first aspect A1 to the eighteenth aspect A18, wherein the glass composition comprises greater than or equal to greater than or equal to 0.01 mol % and less than or equal to 1 mol % $SnO_2$.

A twentieth aspect A20 includes the glass composition according to any one of the first aspect A1 to the nineteenth aspect A19, wherein the glass composition comprises greater than or equal to 12 mol % and less than or equal to 17.5 mol % $Al_2O_3$.

A twenty-first aspect A21 includes the glass composition according to any one of the first aspect A1 to the twentieth aspect A20, wherein the glass composition comprises greater than or equal to 2 mol % and less than or equal to 9 mol % $B_2O_3$.

A twenty-second aspect A22 includes the glass composition according to any one of the first aspect A1 to the twenty-first aspect A21, wherein the glass composition comprises greater than or equal to 12 mol % and less than or equal to 18 mol % $Al_2O_3$.

A twenty-third aspect A23 includes the glass composition according to any one of the first aspect A1 to the twenty-second aspect A22, wherein the glass composition comprises greater than or equal to 50 mol % and less than or equal to 67 mol % $SiO_2$.

According to a twenty-fourth aspect A24, a colored glass article includes greater than or equal to 50 mol % and less than or equal to 70 mol % $SiO_2$; greater than or equal to 10 mol % and less than or equal to 20 mol % $Al_2O_3$; greater than or equal to 1 mol % and less than or equal to 10 mol % $B_2O_3$; greater than or equal to 7 mol % and less than or equal to 14 mol % $Li_2O$; greater than 0 mol % and less than or equal to 8 mol % $Na_2O$; greater than 0 mol % and less than or equal to 1 mol % $K_2O$; greater than or equal to 0 mol % and less than or equal to 7 mol % CaO; greater than or equal to 0 mol % and less than or equal to 8 mol % MgO; and greater than or equal to 0 mol % and less than or equal to 8 mol % ZnO, wherein: $R_2O+R'O$ is less than or equal to 25 mol %, wherein $R_2O$ is the sum of $Li_2O$, $Na_2O$, and $K_2O$ and R'O is the sum of CaO, MgO, and ZnO; and at least one of: $NiO+Co_3O_4+Cr_2O_3+CuO$ is greater than or equal to 0.001 mol %; $CeO_2$ is greater than or equal to 0.1 mol %; and $TiO_2$ is greater than or equal to 0.1 mol %.

A twenty-fifth aspect A25 includes the colored glass article according to the twenty-fourth aspect A24, wherein $NiO+Co_3O_4+Cr_2O_3+CuO$ is greater than or equal to 0.001 mol % and less than or equal to 3 mol %.

A twenty-sixth aspect A26 includes the colored glass article according to the twenty-fourth aspect A24, wherein $CeO_2$ is greater than or equal to 0.1 mol % and less than or equal to 2 mol %.

A twenty-seventh aspect A27 includes the colored glass article according to the twenty-fourth aspect A24, wherein $TiO_2$ is greater than or equal to 0.1 mol % and less than or equal to 2 mol %.

A twenty-eighth aspect A28 includes the colored glass article according to the twenty-fourth aspect A24, wherein $NiO+Co_3O_4+Cr_2O_3+CuO+CeO_2+TiO_2$ is greater than or equal to 0.001 mol % and less than or equal to 10 mol %.

A twenty-ninth aspect A29 includes the colored glass article according to any one of the twenty-fourth aspect A24 to the twenty-eighth aspect A28, wherein $R_2O+R'O$ is greater than or equal to 7 mol % and less than or equal to 25 mol %.

A thirtieth aspect A30 includes the colored glass article according to any one of the twenty-fourth aspect A24 to the twenty-ninth aspect A29, wherein $R_2O$ is greater than or equal to 7 mol % and less than or equal to 25 mol %.

A thirty-first aspect A31 includes the colored glass article according to any one of the twenty-fourth aspect A24 to the thirtieth aspect A30, wherein R'O is greater than or equal to 0 mol % and less than or equal to 12 mol %.

A thirty-second aspect A32 includes the colored glass article according to any one of the twenty-fourth aspect A24 to the thirty-first aspect A31, wherein $3.802946+0.01747*B_2O_3+0.058769*Al_2O_3+0.080876*Li_2O+0.148433*Na_2O+0.153264*K_2O+0.045179*MgO+0.080113*CaO$ is less than or equal to 6.8.

A thirty-third aspect A33 includes the colored glass article according to any one of the twenty-fourth aspect A24 to the thirty-second aspect A32, wherein $R_2O-Al_2O_3$ is greater than or equal to −8 mol % and less than or equal to 4 mol %.

A thirty-fourth aspect A34 includes the colored glass article according to any one of the twenty-fourth aspect A24 to the thirty-third aspect A33, wherein the colored glass article comprises greater than or equal to 7.5 mol % and less than or equal to 13.5 mol % $Li_2O$.

A thirty-fifth aspect A35 includes the colored glass article according to any one of the twenty-fourth aspect A24 to the thirty-fourth aspect A34, wherein the colored glass article comprises greater than or equal to 0.1 mol % and less than or equal to 7 mol % $Na_2O$.

A thirty-sixth aspect A36 includes the colored glass article according to any one of the twenty-fourth aspect A24 to the thirty-fifth aspect A35, wherein the colored glass article comprises greater than or equal to 0.1 mol % and less than or equal to 0.7 mol % $K_2O$.

A thirty-seventh aspect A37 includes the colored glass article according to any one of the twenty-fourth aspect A24 to the thirty-sixth aspect A36, wherein the colored glass article comprises greater than or equal to 0.25 mol % and less than or equal to 6.5 mol % CaO.

A thirty-eighth aspect A38 includes the colored glass article according to any one of the twenty-fourth aspect A24 to the thirty-seventh aspect A37, wherein the colored glass article comprises greater than or equal to 0.25 mol % and less than or equal to 7 mol % MgO.

A thirty-ninth aspect A39 includes the colored glass article according to any one of the twenty-fourth aspect A24 to the thirty-eighth aspect A38, wherein the colored glass article comprises greater than or equal to 0.5 mol % and less than or equal to 7 mol % ZnO.

A fortieth aspect A40 includes the colored glass article according to any one of the twenty-fourth aspect A24 to the thirty-ninth aspect A39, wherein the colored glass article comprises greater than or equal to 0.01 mol % and less than or equal to 1 mol % $Fe_2O_3$.

A forty-first aspect A41 includes the colored glass article according to any one of the twenty-fourth aspect A24 to the thirty-ninth aspect A39, wherein the glass composition comprises greater than or equal to 0.001 mol % and less than or equal to 0.5 mol % $Fe_2O_3$.

A forty-second aspect A42 includes the colored glass article according to any one of the twenty-fourth aspect A24 to the forty-first aspect A41, wherein the colored glass article comprises greater than or equal to greater than or equal to 0.01 mol % and less than or equal to 1 mol % $SnO_2$.

A forty-third aspect A43 includes the colored glass article according to any one of the twenty-fourth aspect A24 to the forty-second aspect A42, wherein the colored glass article comprises greater than or equal to 12 mol % and less than or equal to 17.5 mol % $Al_2O_3$.

A forty-fourth aspect A44 includes the colored glass article according to any one of the twenty-fourth aspect A24 to the forty-third aspect A43, wherein the colored glass article comprises greater than or equal to 2 mol % and less than or equal to 9 mol % $B_2O_3$.

A forty-fifth aspect A45 includes the colored glass article according to any one of the twenty-fourth aspect A24 to the forty-fourth aspect A44, wherein the colored glass article comprises greater than or equal to 12 mol % and less than or equal to 18 mol % $Al_2O_3$.

A forty-sixth aspect A46 includes the colored glass article according to any one of the twenty-fourth aspect A24 to the forty-fifth aspect A45, wherein the colored glass article comprises greater than or equal to 50 mol % and less than or equal to 67 mol % $SiO_2$.

A forty-seventh aspect A47 includes the colored glass article according to any one of the twenty-fourth aspect A24 to f the orty-sixty aspect A46, wherein the colored glass article has a transmittance color coordinate in the CIELAB color space, as measured at an article thickness of 1.33 mm under F2 illumination and a 10° standard observer angle, of L* greater than or equal to 65 and less than or equal to 98, a* greater than or equal to −20 and less than or equal to 10, and b* greater than or equal to −15 and less than or equal to 15.

A forty-eighth aspect A48 includes the colored glass article according to any one of the twenty-fourth aspect A24 to forty-seventh aspect A47, wherein the colored glass article has a dielectric constant Dk at 10 GHz less than or equal to 6.8.

A forty-ninth aspect A49 includes the colored glass article according to any one of the twenty-fourth aspect A24 to the forty-eighth aspect A48, wherein the colored glass article has a thickness greater than or equal to 250 μm and less than or equal to 6 mm.

A fiftieth aspect A50 includes the colored glass article according to any one of the twenty-fourth aspect A24 to the forty-ninth aspect A49, wherein the colored glass article has have a $K_{IC}$ fracture toughness as measured by a chevron notch short bar method greater than or equal to 0.7 $MPa \cdot m^{1/2}$.

A fifty-first aspect A51 includes the colored glass article according to any one of the twenty-fourth aspect A24 to the fiftieth aspect A50, wherein the colored glass article is an ion-exchanged colored glass article.

A fifty-second aspect A52 includes the colored glass article according to any one of the twenty-fourth aspect A24 to the fifty-first A51, wherein the ion-exchanged colored glass article has a depth of compression 3 μm or greater.

A fifty-third aspect A53 includes the colored glass article according to any one of the twenty-fourth aspect A24 to the fifty-second aspect A52, wherein the ion-exchanged colored glass article has a thickness "t" and a depth of compression greater than or equal to 0.15t.

A fifty-fourth aspect A54 includes the colored glass article according to any one of the twenty-fourth aspect A24 to the fifty-third aspect A53, wherein the ion-exchanged colored glass article has a surface compressive stress greater than or equal to 300 MPa.

A fifty-fifth aspect A55 includes the colored glass article according to any one of the twenty-fourth aspect A24 to the fifty-fourth aspect A54, wherein the ion-exchanged colored glass article has a maximum central tension greater than or equal to 40 MPa.

According to a fifty-sixth aspect A56, consumer electronic devices includes a housing having a front surface, a back surface, and side surfaces; and electrical components provided at least partially within the housing, the electrical components including at least a controller, a memory, and a display, the display being provided at or adjacent the front surface of the housing wherein the housing comprises the colored glass article according to any one of the twenty-fourth aspect A24 to the fifty-fifth aspect A55.

According to a fifty-seventh aspect A57, a method of forming a colored glass article includes heat treating a glass composition to form the colored glass article, the glass composition comprising: greater than or equal to 50 mol % and less than or equal to 70 mol % $SiO_2$; greater than or equal to 10 mol % and less than or equal to 20 mol % $Al_2O_3$; greater than or equal to 1 mol % and less than or equal to 10 mol % $B_2O_3$; greater than or equal to 7 mol % and less than or equal to 14 mol % $Li_2O$; greater than 0 mol % and less than or equal to 8 mol % $Na_2O$; greater than 0 mol % and less than or equal to 1 mol % $K_2O$; greater than or equal to 0 mol % and less than or equal to 7 mol % CaO; greater than or equal to 0 mol % and less than or equal to 8 mol % MgO; and greater than or equal to 0 mol % and less than or equal to 8 mol % ZnO, wherein: $R_2O+R'O$ is less than or equal to 25 mol %, wherein $R_2O$ is the sum of $Li_2O$, $Na_2O$, and $K_2O$ and R'O is the sum of CaO, MgO, and ZnO; and at least one of: $NiO+Co_3O_4+Cr_2O_3+CuO$ is greater than or equal to 0.001 mol %; $CeO_2$ is greater than or equal to 0.1 mol %; and $TiO_2$ is greater than or equal to 0.1 mol %.

A fifty-eighth aspect A58 includes the method according to the fifty-seventh aspect A57, the heat treating step may comprise: (i) heating the glass composition at a rate of 1-100° C./min to glass homogenization temperature; (ii) maintaining the glass composition at the glass homogenization temperature for a time greater than or equal to 0.25 hour and less than or equal to 40 hours to produce the colored glass article; and (iii) cooling the formed colored glass article to room temperature.

A fifty-ninth aspect A59 includes the method according to the fifty-seventh aspect A57 or fifty-eighth aspect A58, further comprising strengthening the colored glass article in an ion exchange bath at a temperature greater than or equal to 350° C. to less than or equal to 500° C. for a time period greater than or equal to 2 hours to less than or equal to 12 hours to form an ion exchanged glass article.

A sixtieth aspect A60 includes the method according to the fifty-ninth aspect A59, wherein the ion exchange bath comprises $KNO_3$.

A sixty-first aspect A61 includes the method according to the sixtieth aspect A60, wherein the ion exchange bath comprises $NaNO_3$.

Additional features and advantages of the colored glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
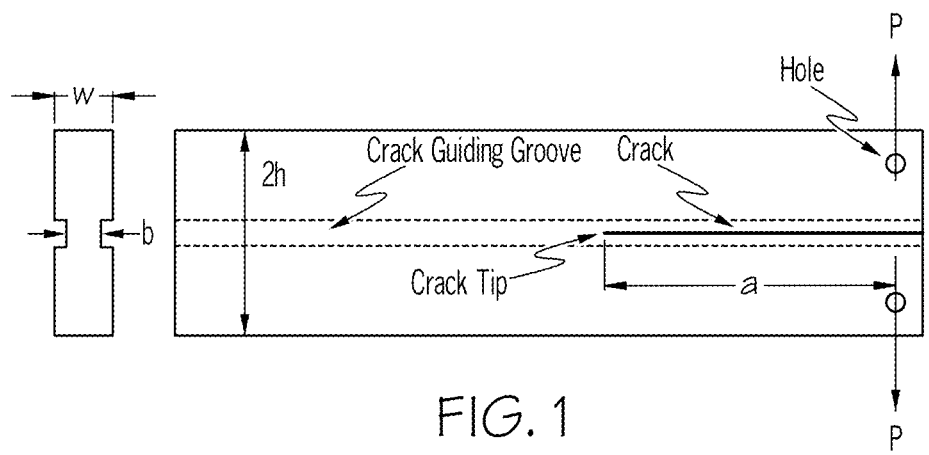
FIG. 1 is a schematic representation of an example utilized in the double cantilever beam (DCB) procedure to determine the fracture toughness $K_{IC}$ and a cross-section thereof.

Reference will now be made in detail to various embodiments of glass compositions and colored glass articles formed therefrom having a desired color and suitable for use in high frequency applications. According to embodiments, a glass composition includes greater than or equal to 50 mol % and less than or equal to 70 mol % $SiO_2$; greater than or equal to 10 mol % and less than or equal to 20 mol % $Al_2O_3$; greater than or equal to 1 mol % and less than or equal to 10 mol % $B_2O_3$; greater than or equal to 7 mol % and less than or equal to 14 mol % $Li_2O$; greater than 0 mol % and less than or equal to 8 mol % $Na_2O$; greater than 0 mol % and less than or equal to 1 mol % $K_2O$; greater than or equal to 0 mol % and less than or equal to 7 mol % CaO; greater than or equal to 0 mol % and less than or equal to 8 mol % MgO; and greater than or equal to 0 mol % and less than or equal to 8 mol % ZnO. $R_2O+R'O$ is less than or equal to 25 mol %, wherein $R_2O$ is the sum of $Li_2O$, $Na_2O$, and $K_2O$ and R'O is the sum of CaO, MgO, and ZnO. The glass composition includes at least one of $NiO+Co_3O_4+Cr_2O_3+CuO$ is greater than or equal to 0.001 mol %, $CeO_2$ is greater than or equal to 0.1 mol %, and $TiO_2$ is greater than or equal to 0.1 mol %. Various embodiments of colored glass articles and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions and the resultant colored glass articles described herein, the concentrations of constituent components in oxide form (e.g., $SiO_2$, $Al_2O_3$, and the like) are specified in mole percent (mol %) on an oxide basis, unless otherwise specified.

The term "substantially free," when used to describe the concentration and/or absence of a particular constituent component in a glass composition and the resultant colored glass article, means that the constituent component is not intentionally added to the glass composition and the resultant colored glass article. However, the glass composition and the resultant colored glass article may contain traces of the constituent component as a contaminant or tramp in amounts of less than 0.01 mol %, unless specified otherwise herein. It is noted that the definition of "substantially free" is exclusive of NiO, $Co_3O_4$, $Cr_2O_3$, and CuO, which may be intentionally added to the glass composition in relatively small amounts such as, for example and without limitation, amounts less than 0.01 mol % to achieve a descried color in the resultant colored glass article.

The terms "0 mol %" and "free," when used to describe the concentration and/or absence of a particular constituent component in a glass composition, means that the constituent component is not present in the glass composition.

The term "fracture toughness," as used herein, refers to the $K_{IC}$ value, and is measured by the chevron notched short bar method and prior to any ion-exchange processing, unless otherwise indicated. The chevron notched short bar (CNSB) method is disclosed in Reddy, K. P. R et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

Alternative $K_{IC}$ fracture toughness measurements were performed on some samples with the double cantilever beam (DCB) procedure. The DCB specimen geometry is shown in FIG. 1 with parameters being the crack length a, applied load P, cross-sectional dimensions w and 2h, and the thickness of the crack-guiding groove b. The samples were cut into rectangles of width 2h=1.25 cm and a thickness ranging from, w=0.3 mm to 1 mm, with the overall length of the sample, which is not a critical dimension, varying from 5 cm to 10 cm. A hole was drilled on both ends with a diamond drill to provide a means of attaching the sample to a sample holder and to the load. A crack "guiding groove" was cut down the length of the sample on both flat faces using a wafer dicing saw with a diamond blade, leaving a "web" of material, approximately half the total plate thickness (dimension b in FIG. 49), with a height of 180 m corresponding to the blade thickness. The high precision dimensional tolerances of the dicing saw allow for minimal sample-to-sample variation. The dicing saw was also used to cut an initial crack where a=15 mm. As a consequence of this final operation a very thin wedge of material was created near the crack tip (due to the blade curvature) allowing for easier crack initiation in the sample. The samples were mounted in a metal sample holder with a steel wire in the bottom hole of the sample. The samples were also supported on the opposite end to keep the samples level under low loading conditions. A spring in series with a load cell (FUTEK, LSB200) was hooked to the upper hole which was then extended, to gradually apply load, using rope and a high precision slide. The crack was monitored using a microscope having a 5 μm resolution attached to a digital camera and a computer. The applied stress intensity, Kr, was calculated using the following equation:

$$K_P = \left[\frac{P \cdot a}{(w \cdot b)^{0.5} h^{1.5}}\right]\left[3.47 + 2.32\frac{h}{a}\right]$$

For each sample, a crack was first initiated at the tip of the web, and then the starter crack was carefully sub-critically grown until the ratio of dimensions a/h was greater than 1.5 to accurately calculate stress intensity. At this point the crack length, a, was measured and recorded using a traveling microscope with 5 m resolution. A drop of toluene was then placed into the crack groove and wicked along the length of the groove by capillary forces, pinning the crack from moving until the fracture toughness is reached. The load was then increased until sample fracture occurred, and the critical stress intensity $K_{IC}$ calculated from the failure load and sample dimensions, with $K_P$ being equivalent to $K_{IC}$ due to the measurement method.

Figure 2:
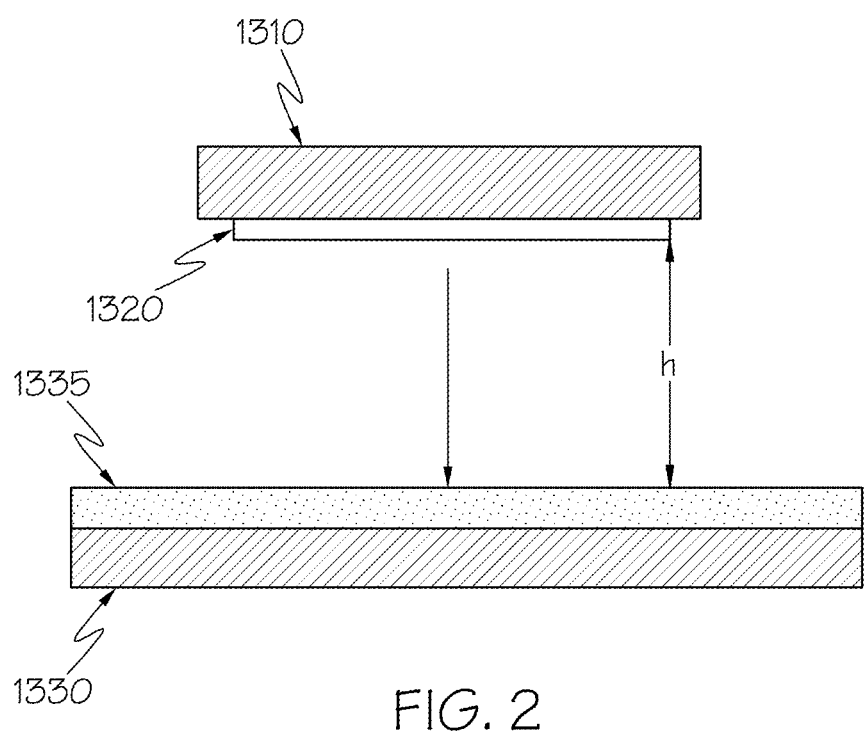
FIG. 2 is a schematic representation of an example utilized in a drop test to determine drop performance.

A typical drop testis schematically shown in FIG. 2. Each sample 1310 was affixed to a standard test vehicle 1320, which approximates the size, mass, and balance of a generic "smart" phone, and dropped from a drop height h onto a sheet of sandpaper 1330 having an abrasive surface 1335. The drop height h ranged from about 0.2 meter to 2.2 meters in incremental heights of 0.1 meter. Drop testing was carried out using a 180-grit silicon carbide sandpaper surface and an 80 grit silicon carbide sandpaper surface. The drop performance is reported in terms of the maximum drop height in cm before failure of the colored glass article.

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass article. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The term "depth of compression" (DOC), as used herein, refers to the position in the article where compressive stress transitions to tensile stress.

The term "CIELAB color space," as used herein, refers to a color space defined by the International Commission on Illumination (CIE) in 1976. It expresses color as three values: L* for the lightness from black (0) to white (100), a* from green (−) to red (+), and B* from blue (−) to yellow (+).

The term "color gamut," as used herein, refers to the pallet of colors that may be achieved by the colored glass articles within the CIELAB color space.

The dielectric constant of the colored glass articles may be measured using a split post dielectric resonator (SPDR), as is known in the art, at a frequency of 10 GHz. The dielectric constant was measured on samples of the colored glass article having a length of 3 inches (76.2 mm), a width of 3 inches (76.2 mm), and a thickness of less than 0.9 mm.

The dielectric constant of the colored glass articles may also be measured over a range of frequencies from 10 GHz to 60 GHz using a double concave reflecting mirror Fabry-Perot open resonator, as is known in the art. The dielectric constant can be measured at different frequencies by adjusting the mirror spacing in the open resonator. The dielectric constant may be measured on samples of the colored glass article having a length of 120 mm, a width of 120 mm, and a thickness of 2 mm or less. While not wishing to be bound by theory, it is believed that the dielectric constant of the colored glass articles measured at 10 GHz approximates the dielectric constant at each frequency in the range from 10 GHz to 60 GHz.

The dielectric constant Dk of the colored glass article may be calculated according to the equation:

$Dk$=3.802946+0.01747*$B_2O_3$ (mol %)+0.058769*$Al_2O_3$ (mol %)+0.080876*$Li_2O$ (mol %)+0.148433*$Na_2O$ (mol %)+0.153264*$K_2O$ (mol %)+0.045179*$MgO$ (mol %))+0.080113*$CaO$ (mol %).

Colorants have been added to conventional aluminosilicate glass compositions to achieve a colored glass article having a desired color and improved mechanical properties. For example, transition metal oxides and/or rare earth oxides may be added. However, simply including colorants in aluminosilicate glass compositions may not produce the desired color and/or result in in colored glass articles suitable for use in electronic devices transmitting and/or receiving high frequencies (e.g., frequencies of fifth generation (5G)).

Disclosed herein are glass compositions and colored glass articles formed therefrom that mitigate the aforementioned problems such that transition metal oxides and/or rare earth oxides may be added to produce colored articles having the desired color and a reduced dielectric constant for use in high frequency applications while retaining the superior ion-exchangeability and drop performance of the colored glass articles. Specifically, the glass compositions disclosed herein include transition metal oxides and/or rare earth oxides to achieve a desired color. Moreover, the glass compositions disclosed herein include a relatively low concentration (e.g., less than or equal to 25 mol %) of alkali oxides (e.g., $Li_2O$, $Na_2O$, and $K_2O$) and alkaline earth oxides (i.e., CaO, MgO, and ZnO) to achieve a reduced dielectric constant (e.g., less than or equal to 6.90).

The glass compositions and colored glass articles described herein may be described as aluminoborosilicate glass compositions and colored glass articles and comprise $SiO_2$, $Al_2O_3$, and $B_2O_3$. In addition to $SiO_2$, $Al_2O_3$, and $B_2O_3$, the glass compositions and colored glass articles described herein include transition metal oxides (e.g., NiO, $Co_3O_4$, $Cr_2O_3$, CuO, $TiO_2$) and/or rare earth oxides ($CeO_2$) to produce colored glass articles having the desired color. Moreover, the glass compositions and colored glass articles disclosed herein include a relatively low sum (e.g., less than or equal to 25 mol %) of $R_2O$ (i.e., $Li_2O$, $Na_2O$, and $K_2O$) and R'O (i.e., CaO, MgO, and ZnO) to achieve a reduced dielectric constant (e.g., less than or equal to 6.8). The glass compositions and colored glass articles described herein also include alkali oxides, such as $Li_2O$, $Na_2O$, and $K_2O$, to enable the ion-exchangeability of the colored glass articles.

$SiO_2$ is the primary glass former in the glass compositions described herein and may function to stabilize the network structure of the colored glass articles. The concentration of $SiO_2$ in the glass compositions and resultant colored glass articles should be sufficiently high (e.g., greater than or equal to 50 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 70 mol %) to control the melting point of the glass composition, as the melting point of pure $SiO_2$ or high $SiO_2$ glasses is undesirably high. Thus, limiting the concentration of $SiO_2$ may aid in improving the meltability and the formability of the resultant colored glass article.

In embodiments, the glass composition and the resultant colored glass article may comprise greater than or equal to 50 mol % and less than or equal to 70 mol % $SiO_2$. In embodiments, the concentration of $SiO_2$ in the glass composition and the resultant colored glass article may be greater than or equal to 50 mol %, greater than or equal to 53 mol %, greater than or equal to 55 mol %, or even greater than or equal to 57 mol %. In embodiments, the concentration of $SiO_2$ in the glass composition and the colored resultant glass article may be greater than or equal to 50 mol % and less than or equal to 70 mol %, greater than or equal to 50 mol % and less than or equal to 67 mol %, greater than or equal to 50 mol % and less than or equal to 65 mol % greater than or equal to 50 mol % and less than or equal to 63 mol %, greater than or equal to 53 mol % and less than or equal to 70 mol %, greater than or equal to 53 mol % and less than or equal to 67 mol %, greater than or equal to 53 mol % and less than or equal to 65 mol % greater than or equal to 53 mol % and less than or equal to 63 mol %, greater than or equal to 55 mol % and less than or equal to 70 mol %, greater than or equal to 55 mol % and less than or equal to 67 mol %, greater than or equal to 55 mol % and less than or equal to 65 mol % greater than or equal to 55 mol % and less than or equal to 63 mol %, greater than or equal to 57 mol % and less than or equal to 70 mol %, greater than or equal to 57 mol % and less than or equal to 67 mol %, greater than or equal to 57 mol % and less than or equal to 65 mol % greater than or equal to 57 mol % and less than or equal to 63 mol %, or any and all sub-ranges formed from any of these endpoints.

Like $SiO_2$, $Al_2O_3$ may also stabilize the glass network and additionally provides improved mechanical properties and chemical durability to the glass composition and the resultant colored glass article. The amount of $Al_2O_3$ may also be tailored to control the viscosity of the glass composition. $Al_2O_3$ may be included such that the resultant glass composition has the desired fracture toughness (e.g., greater than or equal to 0.7 $MPa \cdot m^{1/2}$). However, if the amount of $Al_2O_3$ is too high (e.g., greater than 20 mol %), the viscosity of the melt may increase, thereby diminishing the formability of the colored glass article. In embodiments, if the amount of $Al_2O_3$ is too high, the solubility of one or more colorants in the glass melt may decrease, resulting in the formation of undesirable crystal phases in the glass. For example and without limitation, when the colorant includes $Cr_2O_3$, the solubility of $Cr_2O_3$ in the glass melt may decrease with increasing $Al_2O_3$ concentrations (e.g., concentrations greater than or equal to 17.5 mol %), leading to the precipitation of undesirable crystal phases. Without wishing to be bound by theory, it is hypothesized that similar behavior may occur with colorants other than $Cr_2O_3$.

Accordingly, in embodiments, the glass composition and the resultant colored glass article may comprise greater than or equal to 10 mol % and less than or equal to 20 mol % $Al_2O_3$. In embodiments, the concentration of $Al_2O_3$ in the glass composition and the resultant colored glass article may be greater than or equal to 10 mol %, greater than or equal to 12 mol %, greater than or equal to 12.5 mol %, greater than or equal to 13 mol %, greater than or equal to 13.5 mol %, or even greater than or equal to 14 mol %. In embodiments, the concentration of $Al_2O_3$ in the glass composition and the resultant colored glass article may be less than or equal to 20 mol %, less than or equal to 18 mol %, less than or equal to 17.5 mol %, or even less than or equal to 17 mol %. In embodiments, the concentration of $Al_2O_3$ in the glass composition and the resultant colored glass article may be greater than or equal to 10 mol % and less than or equal to 20 mol %, greater than or equal to 10 mol % and less than or equal to 18 mol % greater than or equal to 10 mol % and less than or equal to 17.5 mol %, greater than or equal to 10 mol % and less than or equal to 17 mol %, greater than or equal to 12 mol % and less than or equal to 20 mol %, greater than or equal to 12 mol % and less than or equal to 18 mol % greater than or equal to 12 mol % and less than or equal to 17.5 mol %, greater than or equal to 12 mol % and less than or equal to 17 mol %, greater than or equal to 12.5 mol % and less than or equal to 20 mol %, greater than or equal to 12.5 mol % and less than or equal to 18 mol % greater than or equal to 12.5 mol % and less than or equal to 17.5 mol %, greater than or equal to 12.5 mol % and less than or equal to 17 mol %, greater than or equal to 13 mol % and less than or equal to 20 mol %, greater than or equal to 13 mol % and less than or equal to 18 mol % greater than or equal to 13 mol % and less than or equal to 17.5 mol %, greater than or equal to 13 mol % and less than or equal to 17 mol %, greater than or equal to 13.5 mol % and less than or equal to 20 mol %, greater than or equal to 13.5 mol % and less than or equal to 18 mol % greater than or equal to 13.5 mol % and less than or equal to 17.5 mol %, greater than or equal to 13.5 mol % and less than or equal to 17 mol %, greater than or equal to 14 mol % and less than or equal to 20 mol %, greater than or equal to 14 mol % and less than or equal to 18 mol % greater than or equal to 14 mol % and less than or equal to 17.5 mol %, or even greater than or equal to 14 mol % and less than or equal to 17 mol %, or any and all sub-ranges formed from any of these endpoints.

$B_2O_3$ decreases the melting point of the glass composition, which may improve the retention of certain colorants in the glass. $B_2O_3$ may also improve the damage resistance of the resultant colored glass article. In addition, $B_2O_3$ is added to reduce the formation of non-bridging oxygen, the presence of which may reduce fracture toughness. The concentration of $B_2O_3$ should be sufficiently high (e.g., greater than or equal to 1 mol %) to reduce the melting point of the glass composition, improve the formability, and increase the fracture toughness of the colored glass article. However, if $B_2O_3$ is too high (e.g., greater than 10 mol %), the annealing point and strain point may decrease, which increases stress relaxation and reduces the overall strength of the colored glass article.

In embodiments, the glass composition and the resultant colored glass article may comprise greater than or equal to 1 mol % and less than or equal to 10 mol % $B_2O_3$. In embodiments, the concentration of $B_2O_3$ in the glass composition and the resultant colored glass article may be greater than or equal to 1 mol %, greater than or equal to 2 mol %, greater than or equal to 3 mol %, greater than or equal to 4 mol %, greater than or equal to 4.5 mol %, greater than or equal to 5 mol %, or even greater than or equal to 5.5 mol %. In embodiments, the concentration of $B_2O_3$ in the glass composition and the resultant colored glass article may be less than or equal to 10 mol %, less than or equal to 9 mol %, less than or equal to 8 mol %, less than or equal to 7.5 mol %, less than or equal to 7 mol %, or even less than or equal to 6.5 mol %. In embodiments, the concentration of $B_2O_3$ in the glass composition and the resultant colored glass article may be greater than or equal to 1 mol % and less than or equal to 10 mol %, greater than or equal to 1 mol % and less than or equal to 9 mol %, greater than or equal to 1 mol % and less than or equal to 8 mol %, greater than or equal to 1 mol % and less than or equal to 7.5 mol %, greater than or equal to 1 mol % and less than or equal to 7 mol %, greater than or equal to 1 mol % and less than or equal to 6.5 mol %, greater than or equal to 2 mol % and less than or equal to 10 mol %, greater than or equal to 2 mol % and less than or equal to 9 mol %, greater than or equal to 2 mol % and less than or equal to 8 mol %, greater than or equal to 2 mol % and less than or equal to 7.5 mol %, greater than or equal to 2 mol % and less than or equal to 7 mol %, greater than or equal to 2 mol % and less than or equal to 6.5 mol %, greater than or equal to 3 mol % and less than or equal to 10 mol %, greater than or equal to 3 mol % and less than or equal to 9 mol %, greater than or equal to 3 mol % and less than or equal to 8 mol %, greater than or equal to 3 mol % and less than or equal to 7.5 mol %, greater than or equal to 3 mol % and less than or equal to 7 mol %, greater than or equal to 3 mol % and less than or equal to 6.5 mol %, greater than or equal to 4 mol % and less than or equal to 10 mol %, greater than or equal to 4 mol % and less than or equal to 9 mol %, greater than or equal to 4 mol % and less than or equal to 8 mol %, greater than or equal to 4 mol % and less than or equal to 7.5 mol %, greater than or equal to 4 mol % and less than or equal to 7 mol %, greater than or equal to 4 mol % and less than or equal to 6.5 mol %, greater than or equal to 4.5 mol % and less than or equal to 10 mol %, greater than or equal to 4.5 mol % and less than or equal to 9 mol %, greater than or equal to 4.5 mol % and less than or equal to 8 mol %, greater than or equal to 4.5 mol % and less than or equal to 7.5 mol %, greater than or equal to 4.5 mol % and less than or equal to 7 mol %, greater than or equal to 4.5 mol % and less than or equal to 6.5 mol %, greater than or equal to 5 mol % and less than or equal to 10 mol %, greater than or equal to 5 mol % and less than or equal to 9 mol %, greater than or equal to 5 mol % and less than or equal to 8 mol %, greater than or equal to 5 mol % and less than or equal to 7.5 mol %, greater than or equal to 5 mol % and less than or equal to 7 mol %, greater than or equal to 5 mol % and less than or equal to 6.5 mol %, greater than or equal to 5.5 mol % and less than or equal to 10 mol %, greater than or equal to 5.5 mol % and less than or equal to 9 mol %, greater than or equal to 5.5 mol % and less than or equal to 8 mol %, greater than or equal to 5.5 mol % and less than or equal to 7.5 mol %, greater than or equal to 5.5 mol % and less than or equal to 7 mol %, or even greater than or equal to 5.5 mol % and less than or equal to 6.5 mol %, or any and all sub-ranges formed from any of these endpoints.

As described hereinabove, the glass compositions and the resultant colored glass articles may contain alkali oxides, such as $Li_2O$, $Na_2O$, and $K_2O$, to enable the ion-exchangeability of the colored glass articles.

$Li_2O$ aids in the ion-exchangeability of the colored glass article and also reduces the softening point of the glass composition, thereby increasing the formability of the colored glass articles. In addition, $Li_2O$ decreases the melting point of the glass composition, which may help improve retention of colorants in the glass. The concentration of $Li_2O$ in the glass compositions and resultant colored glass articles should be sufficiently high (e.g., greater than or equal to 7 mol %) to reduce the melting point of the glass composition and achieve the desired maximum central tension (e.g., greater than or equal to 40 MPa). However, if the amount of $Li_2O$ is too high (e.g., greater than 14 mol %), the liquidus temperature may increase, thereby diminishing the manufacturability of the colored glass article.

In embodiments, the glass composition and the resultant colored glass article may comprise greater than or equal to 7 mol % and less than or equal to 14 mol % $Li_2O$. In embodiments, the concentration of $Li_2O$ in the glass composition and the resultant colored glass article may be greater than or equal to 7 mol %, greater than or equal to 7.5 mol %, greater than or equal to 8 mol %, or even greater than or equal to 8.5 mol %. In embodiments, the concentration of $Li_2O$ in the glass composition and the resultant colored glass article may be less than or equal to 14 mol %, less than or equal to 13.5 mol %, less than or equal to 13 mol %, or even less than or equal to 12.5 mol %. In embodiments, the concentration of $Li_2O$ in the glass composition and the resultant colored glass article may be greater than or equal to 7 mol % and less than or equal to 14 mol %, greater than or equal to 7 mol % and less than or equal to 13.5 mol %, greater than or equal to 7 mol % and less than or equal to 13 mol %, greater than or equal to 7 mol % and less than or equal to 12.5 mol %, greater than or equal to 7.5 mol % and less than or equal to 14 mol %, greater than or equal to 7.5 mol % and less than or equal to 13.5 mol %, greater than or equal to 7.5 mol % and less than or equal to 13 mol %, greater than or equal to 7.5 mol % and less than or equal to 12.5 mol %, greater than or equal to 8 mol % and less than or equal to 14 mol %, greater than or equal to 8 mol % and less than or equal to 13.5 mol %, greater than or equal to 8 mol % and less than or equal to 13 mol %, greater than or equal to 8 mol % and less than or equal to 12.5 mol %, greater than or equal to 8.5 mol % and less than or equal to 14 mol %, greater than or equal to 8.5 mol % and less than or equal to 13.5 mol %, greater than or equal to 8.5 mol % and less than or equal to 13 mol %, or even greater than or equal to 8.5 mol % and less than or equal to 12.5 mol %, or any and all sub-ranges formed from any of these endpoints.

$Na_2O$ improves diffusivity of alkali ions in the glass and thereby reduces ion-exchange time and helps achieve the desired surface compressive stress (e.g., greater than or equal to 300 MPa). $Na_2O$ also improves formability of the colored glass article. In addition, $Na_2O$ decreases the melting point of the glass composition, which may help improve colorant retention. However, if too much $Na_2O$ is added to the glass composition, the melting point may be too low. As such, in embodiments, the concentration of $Li_2O$ present in the glass composition and the resultant colored glass article may be greater than the concentration of $Na_2O$ present in the glass composition and the resultant colored glass article.

In embodiments, the glass composition and the resultant colored glass article may comprise greater than 0 mol % and less than or equal to 8 mol % $Na_2O$. In embodiments, the concentration of $Na_2O$ in the glass composition and the resultant colored glass article may be greater than 0 mol %, greater than or equal to 0.1 mol %, greater than or equal to 0.5 mol %, or even greater than or equal to 1 mol %. In embodiments, the concentration of $Na_2O$ in the glass composition and the resultant colored glass article may be less than or equal to 8 mol %, less than or equal to 7 mol %, less than or equal to 6 mol %, less than or equal to 5 mol %, less than or equal to 4 mol %, or even less than or equal to 3 mol %, or any and all sub-ranges formed from any of these endpoints. In embodiments, the concentration of $Na_2O$ in the glass composition and the resultant colored glass article may be greater than 0 mol % and less than or equal to 8 mol %, greater than 0 mol % and less than or equal to 7 mol %, greater than 0 mol % and less than or equal to 6 mol %, greater than 0 mol % and less than or equal to 5 mol %, greater than 0 mol % and less than or equal to 4 mol %, greater than 0 mol % and less than or equal to 3 mol %, greater than or equal to 0.1 mol % and less than or equal to 8 mol %, greater than or equal to 0.1 mol % and less than or equal to 7 mol %, greater than or equal to 0.1 mol % and less than or equal to 6 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.5 mol % and less than or equal to 8 mol %, greater than or equal to 0.5 mol % and less than or equal to 7 mol %, greater than or equal to 0.5 mol % and less than or equal to 6 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 1 mol % and less than or equal to 8 mol %, greater than or equal to 1 mol % and less than or equal to 7 mol %, greater than or equal to 1 mol % and less than or equal to 6 mol %, greater than or equal to 1 mol % and less than or equal to 5 mol %, greater than or equal to 1 mol % and less than or equal to 4 mol %, or even greater than or equal to 1 mol % and less than or equal to 3 mol %, or any and all sub-ranges formed from any of these endpoints.

$K_2O$ promotes ion-exchange and may increase the depth of compression and decrease the melting point to improve the formability of the colored glass article. However, adding too much $K_2O$ may cause the surface compressive stress and melting point to be too low. Accordingly, in embodiments, the amount of $K_2O$ added to the glass composition may be limited.

In embodiments, the glass composition and the resultant colored glass article may optionally comprise greater than 0 mol % and less than or equal to 1 mol % $K_2O$. In embodiments, the concentration of $K_2O$ in the glass composition and the resultant colored glass article may be greater than 0 mol %, greater than or equal to 0.1 mol %, or even greater than or equal to 0.2 mol %. In embodiments, the concentration of $K_2O$ in the glass composition and the resultant colored glass article may be less than or equal to 1 mol %, less than or equal to 0.7 mol %, or even less than or equal to 0.5 mol %. In embodiments, the concentration of $K_2O$ in the glass composition and the resultant colored glass article may be greater than 0 mol % and less than or equal to 1 mol %, greater than 0 mol % and less than or equal to 0.7 mol %, greater than 0 mol % and less than or equal to 0.5 mol %, greater than or equal to 0.1 mol % and less than or equal to 1 mol %, greater than or equal to 0.1 mol % and less than or equal to 0.7 mol %, greater than or equal to 0.1 mol % and less than or equal to 0.5 mol %, greater than or equal to 0.2 mol % and less than or equal to 1 mol %, greater than or equal to 0.2 mol % and less than or equal to 0.7 mol %, or even greater than or equal to 0.2 mol % and less than or equal to 0.5 mol %, or any and all sub-ranges formed from any of these endpoints.

$R_2O$ is the sum (in mol %) of $Li_2O$, $Na_2O$, and $K_2O$ present in the glass composition and the resultant colored glass article (i.e., $R_2O=Li_2O$ (mol %)+$Na_2O$ (mol %)+$K_2O$ (mol %)). Like $B_2O_3$, the alkali oxides aid in decreasing the softening point and molding temperature of the glass composition, thereby offsetting the increase in the softening point and molding temperature of the glass composition due to higher amounts of $SiO_2$ in the glass composition, for example. The softening point and molding temperature may be further reduced by including combinations of alkali oxides (e.g., two or more alkali oxides) in the glass composition, a phenomenon referred to as the "mixed alkali effect." However, it has been found that if the amount of $R_2O$ is too high, the average coefficient of thermal expansion of the glass composition increases to greater than $100 \times 10^{-7}/°$ C., which may be undesirable.

In embodiments, the concentration of $R_2O$ in the glass composition and the resultant colored glass article may be greater than or equal to 7 mol %, greater than or equal to 8 mol %, greater than 9 mol %, or even greater than or equal to 10 mol %. In embodiments, the concentration of $R_2O$ in the glass composition and the resultant colored glass article may be less than or equal to 25 mol %, less than or equal to 23 mol %, or even less than or equal to 20 mol %. In embodiments, the concentration of $R_2O$ in the glass composition and the resultant colored glass article may be greater than or equal to 7 mol % and less than or equal to 25 mol %, greater than or equal to 7 mol % and less than or equal to 23 mol %, greater than or equal to 7 mol % and less than or equal to 20 mol %, greater than or equal to 8 mol % and less than or equal to 25 mol %, greater than or equal to 8 mol % and less than or equal to 23 mol %, greater than or equal to 8 mol % and less than or equal to 20 mol %, greater than or equal to 9 mol % and less than or equal to 25 mol %, greater than or equal to 9 mol % and less than or equal to 23 mol %, greater than or equal to 9 mol % and less than or equal to 20 mol %, greater than or equal to 10 mol % and less than or equal to 25 mol %, greater than or equal to 10 mol % and less than or equal to 23 mol %, or even greater than or equal to 10 mol % and less than or equal to 20 mol %, or any and all sub-ranges formed from any of these endpoints.

In embodiments, the difference between $R_2O$ and $Al_2O_3$ (i.e. $R_2O$ (mol %)–$Al_2O_3$ (mol %)) in the glass composition may be adjusted to reduce the formation of non-bridging oxygen, the presence of which may reduce fracture toughness. In embodiments, $R_2O$–$Al_2O_3$ in the glass composition and the resultant colored glass article may be greater than or equal to −8 mol %, greater than or equal to −7, greater than or equal to −6, or even greater than or equal to −5. In embodiments, $R_2O$–$Al_2O_3$ in the glass composition and the resultant colored glass article may be less than or equal to 4 mol %, less than or equal to 3 mol %, less than or equal to 2 mol %, or even less than or equal to 1 mol %. In embodiments, $R_2O-Al_2O_3$ in the glass composition and the resultant colored glass article may be greater than or equal to −8 mol % and less than or equal to 4 mol %, greater than or equal to −8 mol % and less than or equal to 3 mol %, greater than or equal to −8 mol % and less than or equal to 2 mol %, greater than or equal to −8 mol % and less than or equal to 1 mol %, greater than or equal to −7 mol % and less than or equal to 4 mol %, greater than or equal to −7 mol % and less than or equal to 3 mol %, greater than or equal to −7 mol % and less than or equal to 2 mol %, greater than or equal to −7 mol % and less than or equal to 1 mol %, greater than or equal to −6 mol % and less than or equal to 4 mol %, greater than or equal to −6 mol % and less than or equal to 3 mol %, greater than or equal to −6 mol % and less than or equal to 2 mol %, greater than or equal to −6 mol % and less than or equal to 1 mol %, greater than or equal to −5 mol % and less than or equal to 4 mol %, greater than or equal to −5 mol % and less than or equal to 3 mol %, greater than or equal to −5 mol % and less than or equal to 2 mol %, or even greater than or equal to −5 mol % and less than or equal to 1 mol %, or any and all sub-ranges formed from any of these endpoints.

In embodiments, the glass compositions and the resultant colored glass articles described herein may further comprise CaO. CaO lowers the viscosity of a glass composition, which enhances the formability, the strain point and the Young's modulus, and may improve the ion-exchangeability. However, when too much CaO is added to the glass composition, the diffusivity of sodium and potassium ions in the glass composition decreases which, in turn, adversely impacts the ion-exchange performance (i.e., the ability to ion-exchange) of the resultant glass.

In embodiments, the concentration of CaO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of CaO in the glass composition and the resultant colored glass article may be less than or equal to 7 mol %, less than or equal to 6.5 mol %, less than or equal to 6 mol %, less than or equal to 5.5 mol %, less than or equal to 5 mol %, less than or equal to 4.5 mol %, less than or equal to 4 mol %, less than or equal to 3.5 mol %, less than or equal to 3 mol %, less than or equal to 2.5 mol %, less than or equal to 2 mol %, or even less than or equal to 1.75 mol %. In embodiments, the concentration of CaO in the glass composition and the resultant colored glass article may be greater than or equal to 0 mol % and less than or equal to 7 mol %, greater than or equal to 0 mol % and less than or equal to 6.5 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0 mol % and less than or equal to 3 mol %, greater than or equal to 0 mol % and less than or equal to 2.5 mol %, greater than or equal to 0 mol % and less than or equal to 2 mol %, greater than or equal to 0 mol % and less than or equal to 1.75 mol %, greater than or equal to 0.25 mol % and less than or equal to 7 mol %, greater than or equal to 0.25 mol % and less than or equal to 6.5 mol %, greater than or equal to 0.25 mol % and less than or equal to 6 mol %, greater than or equal to 0.25 mol % and less than or equal to 5.5 mol %, greater than or equal to 0.25 mol % and less than or equal to 5 mol %, greater than or equal to 0.25 mol % and less than or equal to 4.5 mol %, greater than or equal to 0.25 mol % and less than or equal to 4 mol %, greater than or equal to 0.25 mol % and less than or equal to 3.5 mol %, greater than or equal to 0.25 mol % and less than or equal to 3 mol %, greater than or equal to 0.25 mol % and less than or equal to 2.5 mol %, greater than or equal to 0.25 mol % and less than or equal to 2 mol %, greater than or equal to 0.25 mol % and less than or equal to 1.75 mol %, greater than or equal to 0.5 mol % and less than or equal to 7 mol %, greater than or equal to 0.5 mol % and less than or equal to 6.5 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 0.5 mol % and less than or equal to 2.5 mol %, greater than or equal to 0.5 mol % and less than or equal to 2 mol %, greater than or equal to 0.5 mol % and less than or equal to 1.75 mol %, greater than or equal to 0.75 mol % and less than or equal to 7 mol %, greater than or equal to 0.75 mol % and less than or equal to 6.5 mol %, greater than or equal to 0.75 mol % and less than or equal to 6 mol %, greater than or equal to 0.75 mol % and less than or equal to 5.5 mol %, greater than or equal to 0.75 mol % and less than or equal to 5 mol %, greater than or equal to 0.75 mol % and less than or equal to 4.5 mol %, greater than or equal to 0.75 mol % and less than or equal to 4 mol %, greater than or equal to 0.75 mol % and less than or equal to 3.5 mol %, greater than or equal to 0.75 mol % and less than or equal to 3 mol %, greater than or equal to 0.75 mol % and less than or equal to 2.5 mol %, greater than or equal to 0.75 mol % and less than or equal to 2 mol %, or even greater than or equal to 0.75 mol % and less than or equal to 1.75 mol %, or any and all sub-ranges formed from any of these endpoints. In embodiments, the glass composition and the resultant colored glass article may be substantially free or free of CaO.

In embodiments, the glass compositions and the resultant colored glass articles described herein may further comprise MgO. MgO lowers the viscosity of the glass compositions, which enhances the formability, the strain point, and the Young's modulus, and may improve ion-exchangeability. However, when too much MgO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 8 mol % MgO. In embodiments, the concentration of MgO in the glass composition may be greater than or equal to 0 mol %, greater than or equal to 0.5 mol %, greater than or equal to 1 mol %, or even greater than or equal to 1.5 mol %. In embodiments, the concentration of MgO in the glass composition may be less than or equal to 8 mol %, less than or equal to 7 mol %, less than or equal to 6 mol %, less than or equal to 5.5 mol %, less than or equal to 5 mol %, less than or equal to 4.5 mol %, or even less than or equal to 4 mol %. In embodiments, the concentration of MgO in the glass composition may be greater than or equal to 0 mol % and less than or equal to 8 mol %, greater than or equal to 0 mol % and less than or equal to 7 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0.5 mol % and less than or equal to 8 mol %, greater than or equal to 0.5 mol % and less than or equal to 7 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 1 mol % and less than or equal to 8 mol %, greater than or equal to 1 mol % and less than or equal to 7 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1.5 mol % and less than or equal to 8 mol %, greater than or equal to 1.5 mol % and less than or equal to 7 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, or even greater than or equal to 1.5 mol % and less than or equal to 4 mol %, or any and all sub-ranges formed from any of these endpoints. In embodiments, the glass composition and the resultant colored glass article may be substantially free or free of MgO.

In embodiments, the glass compositions and the resultant colored glass articles described herein may further comprise ZnO. ZnO lowers the viscosity of the glass compositions, which enhances the formability, the strain point, and the Young's modulus, and may improve ion-exchangeability. However, when too much ZnO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 8 mol % ZnO. In embodiments, the concentration of ZnO in the glass composition may be greater than or equal to 0 mol %, greater than or equal to 0.5 mol %, greater than or equal to 1 mol %, or even greater than or equal to 1.5 mol %. In embodiments, the concentration of ZnO in the glass composition may be less than or equal to 8 mol %, less than or equal to 7 mol %, less than or equal to 6 mol %, less than or equal to 5.5 mol %, less than or equal to 5 mol %, less than or equal to 4.5 mol %, or even less than or equal to 4 mol %. In embodiments, the concentration of ZnO in the glass composition may be greater than or equal to 0 mol % and less than or equal to 8 mol %, greater than or equal to 0 mol % and less than or equal to 7 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0.5 mol % and less than or equal to 8 mol %, greater than or equal to 0.5 mol % and less than or equal to 7 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 1 mol % and less than or equal to 8 mol %, greater than or equal to 1 mol % and less than or equal to 7 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1.5 mol % and less than or equal to 8 mol %, greater than or equal to 1.5 mol % and less than or equal to 7 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, or even greater than or equal to 1.5 mol % and less than or equal to 4 mol %, or any and all sub-ranges formed from any of these endpoints. In embodiments, the glass composition and the resultant colored glass article may be substantially free or free of ZnO.

R'O is the sum (in mol %) of CaO, MgO, and ZnO present in the glass composition and the resultant colored glass article (i.e., R'O=CaO (mol %)+MgO (mol %)+ZnO (mol %)). In embodiments, the concentration of R'O in the glass composition and the resultant colored glass article may be greater than or equal 0 mol %, greater than or equal to 0.5 mol %, greater than or equal to 1 mol %, greater than or equal to 2 mol %, greater than or equal to 3 mol %, or even greater than or equal to 4 mol %. In embodiments, the concentration of R'O in the glass composition and the resultant colored glass article may be less than or equal to 12 mol %, less than or equal to 10 mol %, less than or equal to 8 mol %, or even less than or equal to 6 mol %. In embodiments, the concentration of R'O in the glass composition and the resultant colored glass article may be greater than or equal to 0 mol % and less than or equal to 12 mol %, greater than or equal to 0 mol % and less than or equal to 10 mol %, greater than or equal to 0 mol % and less than or equal to 8 mol %, greater than or equal to 0 mol % and less than or equal to 6 mol %, greater than or equal to 0.5 mol % and less than or equal to 12 mol %, greater than or equal to 0.5 mol % and less than or equal to 10 mol %, greater than or equal to 0.5 mol % and less than or equal to 8 mol %, greater than or equal to 0.5 mol % and less than or equal to 6 mol %, greater than or equal to 1 mol % and less than or equal to 12 mol %, greater than or equal to 1 mol % and less than or equal to 10 mol %, greater than or equal to 1 mol % and less than or equal to 8 mol %, greater than or equal to 1 mol % and less than or equal to 6 mol %, greater than or equal to 2 mol % and less than or equal to 12 mol %, greater than or equal to 2 mol % and less than or equal to 10 mol %, greater than or equal to 2 mol % and less than or equal to 8 mol %, greater than or equal to 2 mol % and less than or equal to 6 mol %, greater than or equal to 3 mol % and less than or equal to 12 mol %, greater than or equal to 3 mol % and less than or equal to 10 mol %, greater than or equal to 3 mol % and less than or equal to 8 mol %, greater than or equal to 3 mol % and less than or equal to 6 mol %, greater than or equal to 4 mol % and less than or equal to 12 mol %, greater than or equal to 4 mol % and less than or equal to 10 mol %, greater than or equal to 4 mol % and less than or equal to 8 mol %, or even greater than or equal to 4 mol % and less than or equal to 6 mol %, or any and all sub-ranged formed from any of these endpoints.

As described herein, the sum of $R_2O$ and $R'O$ (i.e., $R_2O$ (mol %)+$R'O$ (mol %)) may be relatively low (e.g., less than or equal to 25 mol %) to achieve a reduced dielectric constant (e.g, less than or equal to 6.8), thereby allowing for use of the colored glass article in high frequency applications. In embodiments, $R_2O$+$R'O$ in the glass composition and the resultant colored glass article may be greater than or equal to 7 mol %, greater than or equal to 9 mol %, greater than or equal to 11 mol %, greater than or equal to 13 mol %, or even greater than or equal to 15 mol %. In embodiments, $R_2O$+$R'O$ in the glass composition and the resultant colored glass article may be less than or equal to 25 mol %, less than or equal to 23 mol %, less than or equal to 20 mol %, or even less than or equal to 18 mol %. In embodiments, $R_2O$+$R'O$ in the glass composition and the resultant colored glass article may be greater than or equal to 7 mol % and less than or equal to 25 mol %, greater than or equal to 7 mol % and less than or equal to 23 mol %, greater than or equal to 7 mol % and less than or equal to 20 mol %, greater than or equal to 7 mol % and less than or equal to 18 mol %, greater than or equal to 9 mol % and less than or equal to 25 mol %, greater than or equal to 9 mol % and less than or equal to 23 mol %, greater than or equal to 9 mol % and less than or equal to 20 mol %, greater than or equal to 9 mol % and less than or equal to 18 mol %, greater than or equal to 11 mol % and less than or equal to 25 mol %, greater than or equal to 11 mol % and less than or equal to 23 mol %, greater than or equal to 11 mol % and less than or equal to 20 mol %, greater than or equal to 11 mol % and less than or equal to 18 mol %, greater than or equal to 13 mol % and less than or equal to 25 mol %, greater than or equal to 13 mol % and less than or equal to 23 mol %, greater than or equal to 13 mol % and less than or equal to 20 mol %, greater than or equal to 13 mol % and less than or equal to 18 mol %, greater than or equal to 15 mol % and less than or equal to 25 mol %, greater than or equal to 15 mol % and less than or equal to 23 mol %, greater than or equal to 15 mol % and less than or equal to 20 mol %, or even greater than or equal to 15 mol % and less than or equal to 18 mol %, or any and all sub-ranges formed from any of these endpoints.

The glass compositions and the resultant colored glass articles described herein may further comprise $Fe_2O_3$, which may help improve colorant retention. $Fe_2O_3$ may also act as a colorant, producing colored glass articles that may, for example, be pink in color. In embodiments, the concentration of $Fe_2O_3$ in the glass composition and the resultant colored glass article may be greater than or equal to 0 mol % or even greater than or equal to 0.01 mol %. In embodiments, the concentration of $Fe_2O_3$ in the glass composition and the resultant colored glass article may be less than or equal to 1 mol %, less than or equal to 0.75 mol %, or even less than or equal to 0.5 mol %. In embodiments, the concentration of $Fe_2O_3$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0.01 mol % and less than or equal to 1 mol %, greater than or equal to 0.01 mol % and less than or equal to 0.75 mol %, or even greater than or equal to 0.01 mol % and less than or equal to 0.5 mol %, or any and all sub-ranges formed from any of these endpoints. In embodiments, the glass composition and the resultant colored glass article may be substantially free or free of $Fe_2O_3$.

In embodiments, the concentration of $Fe_2O_3$ in the glass composition and the resultant colored glass article may be greater than or equal to 0 mol %, greater than or equal to 0.001 mol %, or even greater than or equal to 0.005 mol %. In embodiment, the concentration of $Fe_2O_3$ in the glass composition and the resultant colored glass article may be less than or equal to 0.5 mol %, less than or equal to 0.1 mol %, less than or equal to 0.05 mol %, or even less than or equal to 0.01 mol %. In embodiments, the composition and the resultant colored glass article may be greater than or equal to 0 mol % and less than or equal to 0.5 mol %, greater than or equal to 0 mol % and less than or equal to 0.1 mol %, greater than or equal to 0 mol % and less than or equal to 0.05 mol %, greater than or equal to 0 mol % and less than or equal to 0.01 mol %, greater than or equal to 0.001 mol % and less than or equal to 0.5 mol %, greater than or equal to 0.001 mol % and less than or equal to 0.1 mol %, greater than or equal to 0.001 mol % and less than or equal to 0.05 mol %, greater than or equal to 0.001 mol % and less than or equal to 0.01 mol %, greater than or equal to 0.005 mol % and less than or equal to 0.5 mol %, greater than or equal to 0.005 mol % and less than or equal to 0.1 mol %, greater than or equal to 0.005 mol % and less than or equal to 0.05 mol %, or even greater than or equal to 0.005 mol % and less than or equal to 0.01 mol %, or any and all sub-ranges formed from any of these endpoints.

The glass compositions and the resultant colored glass articles described herein may further comprise $SnO_2$. In embodiments, the concentration of $SnO_2$ in the glass composition and the resultant colored glass article may be greater than or equal to 0 mol % or even greater than or equal to 0.01 mol %. In embodiments, the concentration of $SnO_2$ in the glass composition and the resultant colored glass article may be less than or equal to 1 mol %, less than or equal to 0.75 mol %, less than or equal to 0.5 mol %, or even less than or equal to 0.25 mol %. In embodiments, the concentration of $SnO_2$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, or even greater than or equal to 0.01 mol % and less than or equal to 0.25 mol %, or any and all sub-ranges formed from any of these endpoints. In embodiments, the glass composition and the resultant colored glass article may be substantially free or free of $SnO_2$.

In embodiments, the glass compositions and the resultant colored glass articles may include a colorant that comprises or consists of transition metal oxides, rare earth oxides, or combinations thereof, to achieve a desired color. In embodiments, transition metal oxides and/or rare earth oxides may be included in the glass compositions as the sole colorant or in combination with other colorants. In embodiments, colorants based on transition metal oxides and/or rare earth oxides may include NiO, $Co_3O_4$, $Cr_2O_3$, CuO, $CeO_2$, $TiO_2$ and/or combinations thereof.

In embodiments, the glass composition and the resultant colored glass article may comprise greater than or equal to 0.001 mol %, such as greater than or equal to 0.001 mol % and less than or equal to 10 mol %, $NiO+Co_3O_4+Cr_2O_3+CuO+CeO_2+TiO_2$. In embodiments, the concentration of $NiO+Co_3O_4+Cr_2O_3+CuO+CeO_2+TiO_2$ in the glass composition and the resultant colored glass article may be greater than or equal to 0.001 mol % and less than or equal to 5 mol %, greater than or equal to 0.001 mol % and less than or equal to 4 mol %, greater than or equal to 0.001 mol % and less than or equal to 3 mol %, greater than or equal to 0.001 mol % and less than or equal to 2.5 mol %, greater than or equal to 0.001 mol % and less than or equal to 2 mol %, greater than or equal to 0.001 mol % and less than or equal to 1.5 mol %, greater than or equal to 0.01 mol % and less than or equal to 5 mol %, greater than or equal to 0.01 mol % and less than or equal to 4 mol %, greater than or equal to 0.01 mol % and less than or equal to 3 mol %, greater than or equal to 0.01 mol % and less than or equal to 2.5 mol %, greater than or equal to 0.01 mol % and less than or equal to 2 mol %, greater than or equal to 0.01 mol % and less than or equal to 1.5 mol %, greater than or equal to 0.02 mol % and less than or equal to 5 mol %, greater than or equal to 0.02 mol % and less than or equal to 4 mol %, greater than or equal to 0.02 mol % and less than or equal to 3 mol %, greater than or equal to 0.02 mol % and less than or equal to 2.5 mol %, greater than or equal to 0.02 mol % and less than or equal to 2 mol %, greater than or equal to 0.02 mol % and less than or equal to 1.5 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2.5 mol %, greater than or equal to 0.1 mol % and less than or equal to 2 mol %, greater than or equal to 0.1 mol % and less than or equal to 1.5 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2.5 mol %, greater than or equal to 0.5 mol % and less than or equal to 2 mol %, greater than or equal to 0.5 mol % and less than or equal to 1.5 mol %, greater than or equal to 0.7 mol % and less than or equal to 5 mol %, greater than or equal to 0.7 mol % and less than or equal to 4 mol %, greater than or equal to 0.7 mol % and less than or equal to 3 mol %, greater than or equal to 0.7 mol % and less than or equal to 2.5 mol %, greater than or equal to 0.7 mol % and less than or equal to 2 mol %, greater than or equal to 0.7 mol % and less than or equal to 1.5 mol %, greater than or equal to 0.9 mol % and less than or equal to 5 mol %, greater than or equal to 0.9 mol % and less than or equal to 4 mol %, greater than or equal to 0.9 mol % and less than or equal to 3 mol %, greater than or equal to 0.9 mol % and less than or equal to 2.5 mol %, greater than or equal to 0.9 mol % and less than or equal to 2 mol %, greater than or equal to 0.9 mol % and less than or equal to 1.5 mol %, or any and all sub-ranges formed from any of these endpoints. In embodiments, the glass composition and resultant glass article may comprise 0 mol % of one or more of $NiO$, $Co_3O_4$, $Cr_2O_3$, $CuO$, $CeO_2$, and/or $TiO_2$.

In embodiments, the glass composition and the resultant colored glass article may comprise greater than or equal to 0.001 mol %, such as greater than or equal to 0.001 mol % and less than or equal to 3 mol %, $NiO+Co_3O_4+Cr_2O_3+CuO$. In embodiments, the concentration of $NiO+Co_3O_4+Cr_2O_3+CuO$ in the glass composition and the resultant colored glass article may be greater than or equal to 0.001 mol % and less than or equal to 2.5 mol %, greater than or equal to 0.001 mol % and less than or equal to 2 mol %, greater than or equal to 0.001 mol % and less than or equal to 1.5 mol %, greater than or equal to 0.001 mol % and less than or equal to 1 mol %, greater than or equal to 0.001 mol % and less than or equal to 0.5 mol %, greater than or equal to 0.001 mol % and less than or equal to 0.4 mol %, greater than or equal to 0.01 mol % and less than or equal to 2.5 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.4 mol %, greater than or equal to 0.02 mol % and less than or equal to 2.5 mol %, greater than or equal to 0.02 mol % and less than or equal to 2 mol %, greater than or equal to 0.02 mol % and less than or equal to 1.5 mol %, greater than or equal to 0.02 mol % and less than or equal to 1 mol %, greater than or equal to 0.02 mol % and less than or equal to 0.5 mol %, greater than or equal to 0.02 mol % and less than or equal to 0.4 mol %, greater than or equal to 0.1 mol % and less than or equal to 2.5 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, greater than or equal to 0.1 mol % and less than or equal to 0.5 mol %, greater than or equal to 0.1 mol % and less than or equal to 0.4 mol %, greater than or equal to 0.2 mol % and less than or equal to 2.5 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.5 mol %, greater than or equal to 0.2 mol % and less than or equal to 0.4 mol %, or any and all sub-ranges formed from any of these endpoints. In embodiments, the glass composition and resultant glass article may comprise 0 mol % of one or more of $NiO$, $Co_3O_4$, $Cr_2O_3$, and/or $CuO$.

In embodiments, the glass composition and the resultant colored glass article may comprise greater than or equal to 0.1 mol %, such as greater than or equal to 0.1 mol % and less than or equal to 2 mol %, $CeO_2$. In embodiments, the concentration of $CeO_2$ in the glass composition and the resultant colored glass article may be greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.1 mol % and less than or equal to 0.4 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, greater than or equal to 0.2 mol % and less than or equal to 0.5 mol %, greater than or equal to 0.2 mol % and less than or equal to 0.4 mol %, greater than or equal to 0.3 mol % and less than or equal to 1.5 mol %, greater than or equal to 0.3 mol % and less than or equal to 1 mol %, greater than or equal to 0.3 mol % and less than or equal to 0.75 mol %, greater than or equal to 0.3 mol % and less than or equal to 0.5 mol %, greater than or equal to 0.3 mol % and less than or equal to 0.4 mol %, or any and all sub-ranges formed from any of these endpoints.

In embodiments, the glass composition and the resultant colored glass article may comprise greater than or equal to 0.1 mol %, such as greater than or equal to 0.1 mol % and less than or equal to 2 mol %, TiO$_2$. In embodiments, the concentration of TiO$_2$ in the glass composition and the resultant colored glass article may be greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.1 mol % and less than or equal to 0.4 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, greater than or equal to 0.2 mol % and less than or equal to 0.5 mol %, greater than or equal to 0.2 mol % and less than or equal to 0.4 mol %, greater than or equal to 0.3 mol % and less than or equal to 1.5 mol %, greater than or equal to 0.3 mol % and less than or equal to 1 mol %, greater than or equal to 0.3 mol % and less than or equal to 0.75 mol %, greater than or equal to 0.3 mol % and less than or equal to 0.5 mol %, greater than or equal to 0.3 mol % and less than or equal to 0.4 mol %, or any and all sub-ranges formed from any of these endpoints.

In embodiments, the glass composition and the resultant colored glass article may comprise greater than or equal to 0.1 mol %, such as greater than or equal to 0.1 mol % and less than or equal to 2 mol %, CeO$_2$+TiO$_2$. In embodiments, the concentration of CeO$_2$+TiO$_2$ in the glass composition and the resultant colored glass article may be greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.1 mol % and less than or equal to 0.4 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, greater than or equal to 0.2 mol % and less than or equal to 0.5 mol %, greater than or equal to 0.2 mol % and less than or equal to 0.4 mol %, greater than or equal to 0.3 mol % and less than or equal to 1.5 mol %, greater than or equal to 0.3 mol % and less than or equal to 1 mol %, greater than or equal to 0.3 mol % and less than or equal to 0.75 mol %, greater than or equal to 0.3 mol % and less than or equal to 0.5 mol %, greater than or equal to 0.3 mol % and less than or equal to 0.4 mol %, or any and all sub-ranges formed from any of these endpoints.

In embodiments, the glass composition and the resultant colored glass article may comprise greater than or equal to 0 mol %, such as greater than or equal to 0.01 mol % and less than or equal to 0.05 mol %, NiO. In embodiments, the concentration of NiO in the glass composition and the resultant colored glass article may be greater than or equal to 0 mol % and less than or equal to 0.05 mol %, greater than or equal to 0 mol % and less than or equal to 0.04 mol %, greater than or equal to 0 mol % and less than or equal to 0.035 mol %, greater than or equal to 0 mol % and less than or equal to 0.03 mol %, greater than or equal to 0 mol % and less than or equal to 0.025 mol %, greater than or equal to 0 mol % and less than or equal to 0.02 mol %, greater than or equal to 0 mol % and less than or equal to 0.015 mol %, greater than or equal to 0.01 mol % and less than or equal to 0.05 mol %, greater than or equal to 0.01 mol % and less than or equal to 0.04 mol %, greater than or equal to 0.01 mol % and less than or equal to 0.035 mol %, greater than or equal to 0.01 mol % and less than or equal to 0.03 mol %, greater than or equal to 0.01 mol % and less than or equal to 0.025 mol %, greater than or equal to 0.01 mol % and less than or equal to 0.02 mol %, greater than or equal to 0.01 mol % and less than or equal to 0.015 mol %, greater than or equal to 0.015 mol % and less than or equal to 0.05 mol %, greater than or equal to 0.015 mol % and less than or equal to 0.04 mol %, greater than or equal to 0.015 mol % and less than or equal to 0.035 mol %, greater than or equal to 0.015 mol % and less than or equal to 0.03 mol %, greater than or equal to 0.015 mol % and less than or equal to 0.025 mol %, or even greater than or equal to 0.015 mol % and less than or equal to 0.02 mol %, and all sub-ranges formed from any of these endpoints.

In embodiments, the glass composition and the resultant colored glass article may comprise greater than or equal to 0 mol %, such as greater than or equal to 0.1 mol % and less than or equal to 0.5 mol %, CuO. In embodiments, the concentration of CuO in the glass composition and the resultant colored glass article may be greater than or equal to 0.1 mol % and less than or equal to 0.5 mol %, greater than or equal to 0.1 mol % and less than or equal to 0.4 mol %, greater than or equal to 0.1 mol % and less than or equal to 0.35 mol %, greater than or equal to 0.1 mol % and less than or equal to 0.3 mol %, greater than or equal to 0.1 mol % and less than or equal to 0.25 mol %, greater than or equal to 0.1 mol % and less than or equal to 0.2 mol %, greater than or equal to 0.1 mol % and less than or equal to 0.15 mol %, greater than or equal to 0.15 mol % and less than or equal to 0.5 mol %, greater than or equal to 0.15 mol % and less than or equal to 0.4 mol %, greater than or equal to 0.15 mol % and less than or equal to 0.35 mol %, greater than or equal to 0.15 mol % and less than or equal to 0.3 mol %, greater than or equal to 0.15 mol % and less than or equal to 0.25 mol %, or even greater than or equal to 0.15 mol % and less than or equal to 0.2 mol %, and all sub-ranges formed from any of these endpoints.

In embodiments, the glass composition and the resultant colored glass article may comprise greater than or equal to 0 mol %, such as greater than or equal to 0.0001 mol % and less than or equal to 0.01 mol %, Co$_3$O$_4$. In embodiments, the concentration of Co$_3$O$_4$ in the glass composition and the resultant colored glass article may be greater than or equal to 0 mol % and less than or equal to 0.01 mol %, greater than or equal to 0 mol % and less than or equal to 0.0095 mol %, greater than or equal to 0 mol % and less than or equal to 0.009 mol %, greater than or equal to 0 mol % and less than or equal to 0.0085 mol %, greater than or equal to 0 mol % and less than or equal to 0.0075 mol %, greater than or equal to 0 mol % and less than or equal to 0.007 mol %, greater than or equal to 0 mol % and less than or equal to 0.0065 mol %, greater than or equal to 0 mol % and less than or equal to 0.006 mol %, greater than or equal to 0 mol % and less than or equal to 0.0055 mol %, greater than or equal to 0 mol % and less than or equal to 0.005 mol %, greater than or equal to 0 mol % and less than or equal to 0.0045 mol %, greater than or equal to 0 mol % and less than or equal to 0.004 mol %, greater than or equal to 0 mol % and less than or equal to 0.0035 mol %, greater than or equal to 0 mol % and less than or equal to 0.003 mol %, greater than or equal to 0 mol % and less than or equal to 0.0025 mol %, greater than or equal to 0 mol % and less than or equal to 0.002 mol %, greater than or equal to 0.0001 mol % and less than or equal to 0.01 mol %, greater than or equal to 0.0001 mol % and less than or equal to 0.0095 mol %, greater than or equal to 0.0001 mol % and less than or equal to 0.009 mol %, greater than or equal to 0.0001 mol % and less than or equal to 0.0085 mol %, greater than or equal to 0.0001 mol % and less than or equal to 0.0075 mol %, greater than or equal to 0.0001 mol % and less than or equal to 0.007 mol %, greater than or equal to 0.0001 mol % and less than or equal to 0.0065 mol %, greater than or equal to 0.0001 mol % and less than or equal to 0.006 mol %, greater than or equal to 0.0001 mol % and less than or equal to 0.0055 mol %, greater than or equal to 0.0001 mol % and less than or equal to 0.005 mol %, greater than or equal to 0.0001 mol % and less than or equal to 0.0045 mol %, greater than or equal to 0.0001 mol % and less than or equal to 0.004 mol %, greater than or equal to 0.0001 mol % and less than or equal to 0.0035 mol %, greater than or equal to 0.0001 mol % and less than or equal to 0.003 mol %, greater than or equal to 0.0001 mol % and less than or equal to 0.0025 mol %, greater than or equal to 0.0001 mol % and less than or equal to 0.002 mol %, greater than or equal to 0.001 mol % and less than or equal to 0.01 mol %, greater than or equal to 0.001 mol % and less than or equal to 0.0095 mol %, greater than or equal to 0.001 mol % and less than or equal to 0.009 mol %, greater than or equal to 0.001 mol % and less than or equal to 0.0085 mol %, greater than or equal to 0.001 mol % and less than or equal to 0.0075 mol %, greater than or equal to 0.001 mol % and less than or equal to 0.007 mol %, greater than or equal to 0.001 mol % and less than or equal to 0.0065 mol %, greater than or equal to 0.001 mol % and less than or equal to 0.006 mol %, greater than or equal to 0.001 mol % and less than or equal to 0.0055 mol %, greater than or equal to 0.001 mol % and less than or equal to 0.005 mol %, greater than or equal to 0.001 mol % and less than or equal to 0.0045 mol %, greater than or equal to 0.001 mol % and less than or equal to 0.004 mol %, greater than or equal to 0.001 mol % and less than or equal to 0.0035 mol %, greater than or equal to 0.001 mol % and less than or equal to 0.003 mol %, greater than or equal to 0.001 mol % and less than or equal to 0.0025 mol %, greater than or equal to 0.001 mol % and less than or equal to 0.002 mol %, and all sub-ranges formed from any of these endpoints.

In embodiments, the glass composition and the resultant colored glass article may comprise greater than or equal to 0 mol %, such as greater than or equal to 0.01 mol % and less than or equal to 0.05 mol %, $Cr_2O_3$. In embodiments, the concentration of $Cr_2O_3$ in the glass composition and the resultant colored glass article may be greater than or equal to 0 mol % and less than or equal to 0.05 mol %, greater than or equal to 0 mol % and less than or equal to 0.04 mol %, greater than or equal to 0 mol % and less than or equal to 0.035 mol %, greater than or equal to 0 mol % and less than or equal to 0.03 mol %, greater than or equal to 0 mol % and less than or equal to 0.025 mol %, greater than or equal to 0 mol % and less than or equal to 0.02 mol %, greater than or equal to 0 mol % and less than or equal to 0.015 mol %, greater than or equal to 0.01 mol % and less than or equal to 0.05 mol %, greater than or equal to 0.01 mol % and less than or equal to 0.04 mol %, greater than or equal to 0.01 mol % and less than or equal to 0.035 mol %, greater than or equal to 0.01 mol % and less than or equal to 0.03 mol %, greater than or equal to 0.01 mol % and less than or equal to 0.025 mol %, greater than or equal to 0.01 mol % and less than or equal to 0.02 mol %, greater than or equal to 0.01 mol % and less than or equal to 0.015 mol %, greater than or equal to 0.015 mol % and less than or equal to 0.05 mol %, greater than or equal to 0.015 mol % and less than or equal to 0.04 mol %, greater than or equal to 0.015 mol % and less than or equal to 0.035 mol %, greater than or equal to 0.015 mol % and less than or equal to 0.03 mol %, greater than or equal to 0.015 mol % and less than or equal to 0.025 mol %, or even greater than or equal to 0.015 mol % and less than or equal to 0.02 mol %, and all sub-ranges formed from any of these endpoints.

In embodiments, the glass composition and the resultant colored glass article may comprise at least one of: greater than or equal to 0.001 mol % $NiO+Co_3O_4+Cr_2O_3+CuO$, such as greater than or equal to 0.001 mol % and less than or equal to 3 mol % $NiO+Co_3O_4+Cr_2O_3+CuO$ (or any of the ranges of $NiO+Co_3O_4+Cr_2O_3+CuO$ described herein); greater than or equal to 0.1 mol % $CeO_2$, such as greater than or equal to 0.1 mol % and less than or equal to 1.5 mol % $CeO_2$ (or any of the ranges of $CeO_2$ described herein); and greater than or equal to 0.1 mol % $TiO_2$, such as greater than or equal to 0.1 mol % and less than or equal to 2 mol % $TiO_2$ (or any of the ranges of $TiO_2$ described herein).

In embodiments, the glass compositions and the resultant colored glass articles described herein may further include tramp materials such as MnO, $MoO_3$, $WO_3$, $Y_2O_3$, CdO, $As_2O_3$, sulfur-based compounds, such as sulfates, halogens, or combinations thereof. In embodiments, the glass composition and the resultant colored glass article may be substantially free or free of tramp materials such as MnO, $MoO_3$, $WO_3$, $Y_2O_3$, CdO, $As_2O_3$, sulfur-based compounds, such as sulfates, halogens, or combinations thereof.

In embodiments, the process for making a glass article includes heat treating a glass composition described herein at one or more preselected temperatures for one or more preselected times to induce glass homogenization. In embodiments, the heat treatment for making a glass article may include heating a glass composition at a rate of 1-100° C./min to glass homogenization temperature; (ii) maintaining the glass composition at the glass homogenization temperature for a time greater than or equal to 0.25 hour and less than or equal to 40 hours (such as 0.25 hours to 4 hours) to produce a glass article; and cooling the glass composition to room temperature to form the glass article to room temperature. In embodiments, the glass homogenization temperature may be greater than or equal to 300° C. and less than or equal to 700° C. In embodiments, the formed glass article may be a colored glass article such that additional heat treatment is not necessary. In embodiments, the colored glass article may be produced when heating above a certain temperature (e.g., the glass homogenation temperature) such that the maintaining step is not required to produce the colored glass article.

As described herein, the sum of $R_2O$ and R'O (i.e., $R_2O$ (mol %)+R'O (mol %)) may be relatively low (e.g., less than or equal to 25 mol %) to achieve a reduced dielectric constant (e.g, less than or equal to 6.8), thereby allowing for use of the colored glass article in high frequency applications. In embodiments, the colored glass articles described herein may have a dielectric constant Dk at 10 GHz less than or equal to 6.8, such as less than or equal to 6.8 and greater than or equal to 5.6. In embodiments, the dielectric constant of the colored glass article may be less than or equal to 6.8 and greater than or equal to 5.7, less than or equal to 6.8 and greater than or equal to 5.8, less than or equal to 6.8 and greater than or equal to 5.9, less than or equal to 6.8 and greater than or equal to 6.0, less than or equal to 6.8 and greater than or equal to 6.2, less than or equal to 6.6 and greater than or equal to 5.7, less than or equal to 6.6 and greater than or equal to 5.8, less than or equal to 6.6 and greater than or equal to 5.9, less than or equal to 6.6 and greater than or equal to 6.0, less than or equal to 6.6 and greater than or equal to 6.2, less than or equal to 6.4 and greater than or equal to 5.7, less than or equal to 6.4 and greater than or equal to 5.8, less than or equal to 6.4 and greater than or equal to 5.9, less than or equal to 6.4 and greater than or equal to 6.0, less than or equal to 6.4 and greater than or equal to 6.2, less than or equal to 6.3 and greater than or equal to 5.6, less than or equal to 6.3 and greater than or equal to 5.7, less than or equal to 6.3 and greater than or equal to 5.8, less than or equal to 6.3 and greater than or equal to 5.9, less than or equal to 6.3 and greater than or equal to 6.0, less than or equal to 6.3 and greater than or equal to 6.2, less than or equal to 6.2 and greater than or equal to 5.7, less than or equal to 6.2 and greater than or equal to 5.8, less than or equal to 6.2 and greater than or equal to 5.9, less than or equal to 6.2 and greater than or equal to 6.0, or even less than or equal to 6.2 and greater than or equal to 6.1, or any and all sub-ranges formed from any of these endpoints. As noted herein, while not wishing to be bound by theory, it is believed that the dielectric constant of the colored glass articles measured at 10 GHz approximates the dielectric constant at each frequency in the range from 10 GHz to 60 GHz. Accordingly, a dielectric constant reported for a colored glass article at a frequency of 10 GHz approximates the dielectric constant of the colored glass article at each frequency over the frequency range of 10 GHz to 60 GHz, inclusive of endpoints.

In embodiments, when the glass composition and the resultant colored glass articles satisfies the relationship $3.802946+0.01747*B_2O_3+0.058769*Al_2O_3+0.080876*Li_2O+0.148433*Na_2O+0.153264*K_2O+0.045179*MgO+0.080113*CaO$ is less than or equal to 6.8, the dielectric electric constant Dk may be in the desired range (e.g., less than or equal to 6.8). For example, in embodiments, the glass composition and the resultant colored glass articles may satisfy the relationship $3.802946+0.01747*B_2O_3+0.058769*Al_2O_3+0.080876*Li_2O+0.148433*Na_2O+0.153264*K_2O+0.045179*MgO+0.080113*CaO$ is less than or equal to 6.8 and greater than or equal to 5.7, less than or equal to 6.8 and greater than or equal to 5.8, less than or equal to 6.8 and greater than or equal to 5.9, less than or equal to 6.8 and greater than or equal to 6.0, less than or equal to 6.8 and greater than or equal to 6.2, less than or equal to 6.6 and greater than or equal to 5.7, less than or equal to 6.6 and greater than or equal to 5.8, less than or equal to 6.6 and greater than or equal to 5.9, less than or equal to 6.6 and greater than or equal to 6.0, less than or equal to 6.6 and greater than or equal to 6.2, less than or equal to 6.4 and greater than or equal to 5.7, less than or equal to 6.4 and greater than or equal to 5.8, less than or equal to 6.4 and greater than or equal to 5.9, less than or equal to 6.4 and greater than or equal to 6.0, less than or equal to 6.4 and greater than or equal to 6.2, less than or equal to 6.3 and greater than or equal to 5.6, less than or equal to 6.3 and greater than or equal to 5.7, less than or equal to 6.3 and greater than or equal to 5.8, less than or equal to 6.3 and greater than or equal to 5.9, less than or equal to 6.3 and greater than or equal to 6.0, less than or equal to 6.3 and greater than or equal to 6.2, less than or equal to 6.2 and greater than or equal to 5.7, less than or equal to 6.2 and greater than or equal to 5.8, less than or equal to 6.2 and greater than or equal to 5.9, less than or equal to 6.2 and greater than or equal to 6.0, or even less than or equal to 6.2 and greater than or equal to 6.1, or any and all sub-ranges formed from any of these endpoints.

The colored glass articles formed from the glass compositions described herein may be any suitable thickness, which may vary depending on the particular application of the colored glass article. In embodiments, the colored glass articles may have a thickness greater than or equal to 250 µm and less than or equal to 6 mm, greater than or equal to 250 µm and less than or equal to 4 mm, greater than or equal to 250 µm and less than or equal to 2 mm, greater than or equal to 250 µm and less than or equal to 1 mm, greater than or equal to 250 µm and less than or equal to 750 µm, greater than or equal to 250 µm and less than or equal to 500 µm, greater than or equal to 500 µm and less than or equal to 6 mm, greater than or equal to 500 µm and less than or equal to 4 mm, greater than or equal to 500 µm and less than or equal to 2 mm, greater than or equal to 500 µm and less than or equal to 1 mm, greater than or equal to 500 µm and less than or equal to 750 µm, greater than or equal to 750 µm and less than or equal to 6 mm, greater than or equal to 750 µm and less than or equal to 4 mm, greater than or equal to 750 µm and less than or equal to 2 mm, greater than or equal to 750 µm and less than or equal to 1 mm, greater than or equal to 1 mm and less than or equal to 6 mm, greater than or equal to 1 mm and less than or equal to 4 mm, greater than or equal to 1 mm and less than or equal to 2 mm, greater than or equal to 2 mm and less than or equal to 6 mm, greater than or equal to 2 mm and less than or equal to 4 mm, or even greater than or equal to 4 mm and less than or equal to 6 mm, or any and all sub-ranges formed from any of these endpoints.

As discussed hereinabove, colored glass articles formed from the glass compositions described herein may have an increased fracture toughness such that the colored glass articles are more resistant to damage. In embodiments, the colored glass article may have a $K_{IC}$ fracture toughness as measured by a chevron notch short bar method greater than or equal to 0.7 MPa·m$^{1/2}$, greater than or equal to 0.8 MPa·m$^{1/2}$, greater than or equal to 0.9 MPa·m$^{1/2}$, or even greater than or equal to 1.0 MPa·m$^{1/2}$.

In embodiments, the glass compositions described herein are ion-exchangeable to facilitate strengthening the colored glass article made from the glass compositions. In typical ion-exchange processes, smaller metal ions in the glass compositions are replaced or "exchanged" with larger metal ions of the same valence within a layer that is close to the outer surface of the colored glass article made from the glass composition. The replacement of smaller ions with larger ions creates a compressive stress within the layer of the colored glass article made from the glass composition. In embodiments, the metal ions are monovalent metal ions (e.g., Li$^+$, Na$^+$, K$^+$, and the like), and ion-exchange is accomplished by immersing the glass article made from the glass composition in a bath comprising at least one molten salt of the larger metal ion that is to replace the smaller metal ion in the colored glass article. Alternatively, other monovalent ions such as Ag$^+$, Tl$^+$, Cu$^+$, and the like may be exchanged for monovalent ions. The ion-exchange process or processes that are used to strengthen the colored glass article made from the glass composition may include contacting the colored glass article with an ion-exchange medium. In embodiments, the ion-exchange medium may be a molten salt bath. For example, the ion-exchange process may include, but is not limited to, immersion in a single bath or multiple baths of like or different compositions with optional washing and/or annealing steps between immersions.

Upon exposure to the colored glass article, the ion-exchange solution (e.g., KNO$_3$ and/or NaNO$_3$ molten salt bath) may, according to embodiments, beat a temperature greater than or equal to 350° C. and less than or equal to 500° C., greater than or equal to 360° C. and less than or equal to 450° C., greater than or equal to 370° C. and less than or equal to 440° C., greater than or equal to 360° C. and less than or equal to 420° C., greater than or equal to 370°

C. and less than or equal to 400° C., greater than or equal to 375° C. and less than or equal to 475° C., greater than or equal to 400° C. and less than or equal to 500° C., greater than or equal to 410° C. and less than or equal to 490° C., greater than or equal to 420° C. and less than or equal to 480° C., greater than or equal to 430° C. and less than or equal to 470° C., or even greater than or equal to 440° C. and less than or equal to 460° C., or any and all sub-ranges between the foregoing values. In embodiments, the colored glass article may be exposed to the ion-exchange solution for a duration greater than or equal to 2 hours and less than or equal to 24 hours, greater than or equal to 2 hours and less than or equal to 12 hours, greater than or equal to 2 hours and less than or equal to 6 hours, greater than or equal to 8 hours and less than or equal to 24 hours, greater than or equal to 6 hours and less than or equal to 24 hours, greater than or equal to 6 hours and less than or equal to 12 hours, greater than or equal to 8 hours and less than or equal to 24 hours, or even greater than or equal to 8 hours and less than or equal to 12 hours, or any and all sub-ranges formed from any of these endpoints.

In embodiments, a colored glass article made from a glass composition may be ion-exchanged to achieve a depth of compression of 10 μm or greater, 20 μm or greater, 30 μm or greater, 40 μm or greater, 50 μm or greater, 60 μm or greater, 70 μm or greater, 80 μm or greater, 90 μm or greater, or 100 μm or greater. In embodiments, a colored glass article made from a glass composition may be ion-exchanged to achieve a depth of compression of 3 μm or greater or 5 μm or greater. In embodiments, the colored glass article made from the glass composition may have a thickness "t" and may be ion-exchanged to achieve a depth of compression greater than or equal to 0.15t, greater than or equal to 0.17t, or even greater than or equal to 0.2t. In embodiments, the colored glass article made from the glass composition may have a thickness "t" and may be ion-exchanged to achieve a depth of compression less than or equal to 0.3t, less than or equal to 0.27t, or even less than or equal to 0.25t. In embodiments, the colored glass article made from the glass composition described herein may have a thickness "t" and may be ion-exchanged to achieve a depth of compression greater than or equal to 0.15t and less than or equal to 0.3t, greater than or equal to 0.15t and less than or equal to 0.27t, greater than or equal to 0.15t and less than or equal to 0.25t, greater than or equal to 0.17t and less than or equal to 0.3t, greater than or equal to 0.17t and less than or equal to 0.27t, greater than or equal to 0.17t and less than or equal to 0.25t, greater than or equal to 0.2t and less than or equal to 0.3t, greater than or equal to 0.2t and less than or equal to 0.27t, or even greater than or equal to 0.2t and less than or equal to 0.25t, or any and all sub-ranges formed from any of these endpoints.

The development of this surface compression layer is beneficial for achieving a better crack resistance and higher flexural strength compared to non-ion-exchanged materials. The surface compression layer has a higher concentration of the ions exchanged into the colored glass article in comparison to the concentration of the ions exchanged into the colored glass article for the body (i.e., the area not including the surface compression) of the colored glass article. In embodiments, the colored glass article made from the glass composition may have a surface compressive stress after ion-exchange strengthening greater than or equal to 300 MPa, greater than or equal to 400 MPa, greater than or equal to 500 MPa, or even greater than or equal to 600 MPa. In embodiments, the colored glass article made from the glass composition may have a surface compressive stress after ion-exchange strengthening less than or equal to 1 GPa, less than or equal to 900 MPa, or even less than or equal to 800 MPa. In embodiments, the colored glass article made from the glass composition may have a surface compressive stress after ion-exchange strengthening greater than or equal to 300 MPa and less than or equal to 1 GPa, greater than or equal to 300 MPa and less than or equal to 900 MPa, greater than or equal to 300 MPa and less than or equal to 800 MPa, greater than or equal to 400 MPa and less than or equal to 1 GPa, greater than or equal to 400 MPa and less than or equal to 900 MPa, greater than or equal to 400 MPa and less than or equal to 800 MPa, greater than or equal to 500 MPa and less than or equal to 1 GPa, greater than or equal to 500 MPa and less than or equal to 900 MPa, greater than or equal to 500 MPa and less than or equal to 800 MPa, greater than or equal to 600 MPa and less than or equal to 1 GPa, greater than or equal to 600 MPa and less than or equal to 900 MPa, or even greater than or equal to 600 MPa and less than or equal to 800 MPa, or any and all sub-ranges formed from any of these endpoints.

In embodiments, the colored glass articles made from the glass composition may have a central tension after ion-exchange strengthening greater than or equal to 40 MPa, greater than or equal to 60 MPa, greater than or equal to 80 MPa, or even greater than or equal to 100 MPa. In embodiments, the colored glass article made from the glass composition may have a central tension after ion-exchange strengthening less than or equal to 250 MPa, less than or equal to 200 MPa, or even less than or equal to 150 MPa. In embodiments, the colored glass article made from the glass composition may have a central tension after ion-exchange strengthening greater than or equal to 40 MPa and less than or equal to 250 MPa, greater than or equal to 40 MPa and less than or equal to 200 MPa, greater than or equal to 40 MPa and less than or equal to 150 MPa, greater than or equal to 60 MPa and less than or equal to 250 MPa, greater than or equal to 60 MPa and less than or equal to 200 MPa, greater than or equal to 60 MPa and less than or equal to 150 MPa, greater than or equal to 80 MPa and less than or equal to 250 MPa, greater than or equal to 80 MPa and less than or equal to 200 MPa, greater than or equal to 80 MPa and less than or equal to 150 MPa, greater than or equal to 100 MPa and less than or equal to 250 MPa, greater than or equal to 100 MPa and less than or equal to 200 MPa, or even greater than or equal to 100 MPa and less than or equal to 150 MPa, or any and all sub-ranges formed from any of these endpoints. As utilized herein, central tension refers to a maximum central tension value unless otherwise indicated.

As described herein, the glass compositions described herein include a colorant that comprises or consists of transition metal oxides, rare earth oxides, or combinations thereof, to achieve a desired color. In embodiments, a colored glass article may have a transmittance color coordinate in the CIELAB color space, as measured at an article thickness of 1.33 mm under F2 illumination and a 100 standard observer angle, of L* greater than or equal to 65 and less than or equal to 98, a* greater than or equal to −20 and less than or equal to 10, and b* greater than or equal to −15 and less than or equal to 15. In embodiments, a colored glass article may have a transmittance color coordinate in the CIELAB color space, as measured under F2 illumination and a 100 standard observer angle, of L* greater than or equal to 65 and less than or equal to 98, a* greater than or equal to −20 and less than or equal to 10, and b* greater than or equal to −15 and less than or equal to 15. In embodiments, a colored glass article may have a transmittance color coordinate in the CIELAB color space, as measured at an article thickness of 1.33 mm under F2 illumination and a 10° standard observer angle, of L* greater than or equal to 65 and less than or equal to 98, absolute value of a* (i.e., |a*|) greater than or equal to 0.3; and absolute value of b* (i.e., |b*|) greater than or equal to 0.5.

Figure 3:
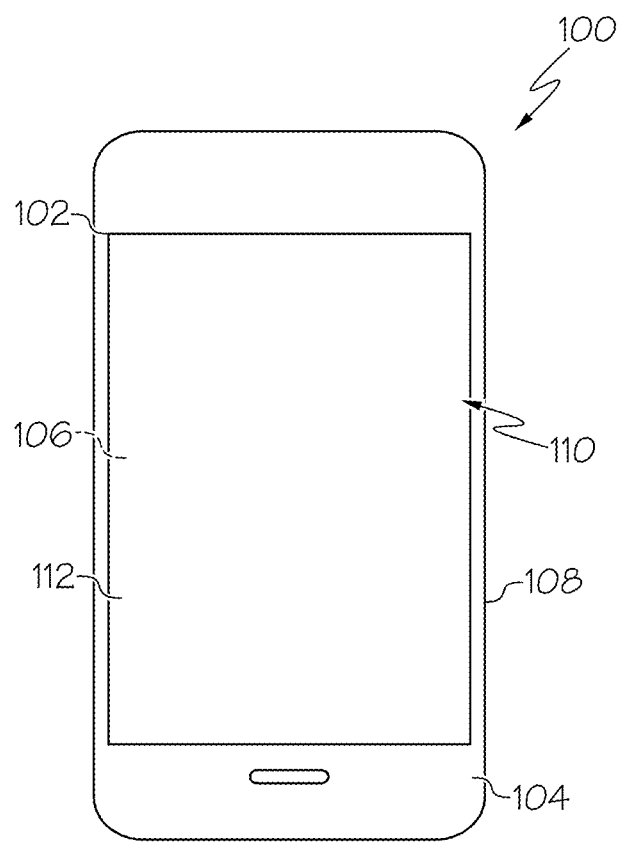
FIG. 3 is a plan view of an electronic device incorporating any of the colored glass articles according to one or more embodiments described herein.
Figure 4:
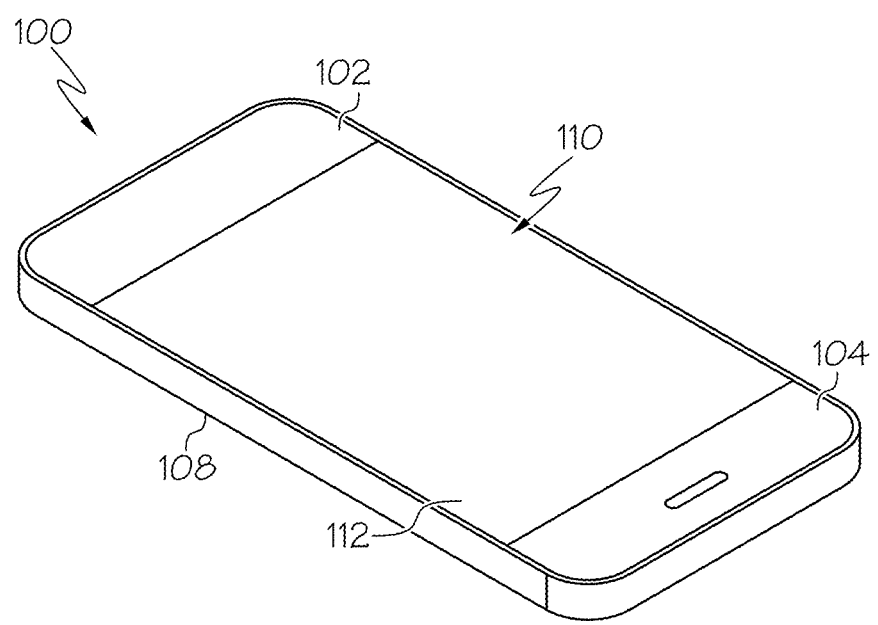
FIG. 4 is a perspective view of the electronic device of FIG. 3.

The colored glass articles described herein may be used for a variety of applications including, for example, back cover applications in consumer or commercial electronic devices such as smartphones, tablet computers, personal computers, ultrabooks, televisions, and cameras. An exemplary article incorporating any of the colored glass articles disclosed herein is shown in FIGS. 3 and 4. Specifically, FIGS. 3 and 4 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least a portion of housing 102, such as the back 106, may include any of the colored glass articles disclosed herein.

EXAMPLES

In order that various embodiments be more readily understood, reference is made to the following examples, which illustrate various embodiments of the colored glass articles described herein.

Table 1 shows batch compositions utilized to form example colored glass articles 1-32 (in terms of mol %).

TABLE 1

| Example | 1 | 2 | 3 | 4 | 5 | 6 |
|---|---|---|---|---|---|---|
| $SiO_2$ | 61.74 | 60.04 | 61.06 | 61.24 | 61.20 | 60.38 |
| $Al_2O_3$ | 15.04 | 15.86 | 15.39 | 15.39 | 15.42 | 15.51 |
| $B_2O_3$ | 6.06 | 6.19 | 6.05 | 5.95 | 5.90 | 5.93 |
| $Li_2O$ | 9.03 | 8.93 | 8.94 | 9.93 | 9.95 | 8.65 |
| $Na_2O$ | 1.41 | 1.40 | 1.40 | 1.50 | 1.50 | 1.41 |
| $K_2O$ | 0.20 | 0.20 | 0.20 | 0.20 | 0.20 | 0.20 |
| CaO | 5.25 | 6.12 | 3.84 | 1.32 | 2.53 | 3.83 |
| MgO | 0.99 | 1.00 | 2.88 | 4.24 | 3.08 | 2.88 |
| ZnO | — | — | — | — | — | — |
| $SnO_2$ | — | — | — | — | — | — |
| $Fe_2O_3$ | — | — | — | — | — | — |
| NiO | 0.0154 | 0.0178 | 0.0170 | 0.0161 | 0.0154 | — |
| $Co_3O_4$ | 0.0001 | 0.0001 | 0.0001 | — | — | — |
| $Cr_2O_3$ | 0.0297 | 0.0287 | 0.0272 | 0.0280 | 0.0266 | 0.0008 |
| CuO | 0.2207 | 0.1959 | 0.1906 | 0.1750 | 0.1758 | 0.0008 |
| $CeO_2$ | — | — | — | — | — | 0.21 |
| $TiO_2$ | 0.01 | 0.01 | 0.01 | 0.01 | 0.01 | 0.99 |
| $R_2O$ | 10.64 | 10.53 | 10.54 | 11.63 | 11.65 | 10.26 |
| R'O | 6.24 | 7.12 | 6.72 | 5.56 | 5.61 | 6.71 |
| $R_2O$ + R'O | 16.88 | 17.65 | 17.26 | 17.19 | 17.26 | 16.97 |
| NiO + $Co_3O_4$ + $Cr_2O_3$ + CuO | 0.266 | 0.243 | 0.235 | 0.219 | 0.218 | 0.002 |

| Example | 7 | 8 | 9 | 10 | 11 | 12 |
|---|---|---|---|---|---|---|
| $SiO_2$ | 59.54 | 61.59 | 61.62 | 61.34 | 61.06 | 61.24 |
| $Al_2O_3$ | 15.98 | 15.28 | 15.09 | 15.32 | 15.39 | 15.39 |
| $B_2O_3$ | 5.90 | 6.01 | 5.94 | 5.94 | 6.05 | 5.95 |
| $Li_2O$ | 8.69 | 9.28 | 9.30 | 9.39 | 8.94 | 9.93 |
| $Na_2O$ | 1.52 | 1.38 | 1.47 | 1.46 | 1.40 | 1.50 |
| $K_2O$ | 0.19 | 0.20 | 0.20 | 0.20 | 0.20 | 0.20 |
| CaO | 1.88 | 4.16 | 4.19 | 4.25 | 3.84 | 1.32 |
| MgO | 5.05 | 1.89 | 1.90 | 1.93 | 2.88 | 4.24 |
| ZnO | — | — | — | — | — | — |
| $SnO_2$ | — | — | — | — | — | — |
| $Fe_2O_3$ | — | — | — | — | — | — |
| NiO | — | 0.0163 | — | 0.0234 | 0.0170 | 0.0161 |
| $Co_3O_4$ | — | — | 0.0023 | 0.0094 | 0.0001 | — |
| $Cr_2O_3$ | 0.0008 | 0.0256 | — | — | 0.0272 | 0.0280 |
| CuO | — | 0.1638 | 0.2810 | 0.1165 | 0.1906 | 0.1750 |
| $CeO_2$ | 0.21 | — | — | — | — | — |
| $TiO_2$ | 1.02 | 0.01 | 0.01 | 0.01 | 0.01 | 0.01 |
| $R_2O$ | 10.40 | 10.86 | 10.97 | 11.05 | 10.54 | 11.63 |
| R'O | 6.93 | 6.05 | 6.09 | 6.18 | 6.72 | 5.56 |
| $R_2O$ + R'O | 17.33 | 16.91 | 17.06 | 17.23 | 17.26 | 17.19 |
| NiO + $Co_3O_4$ + $Cr_2O_3$ + CuO | 0.001 | 0.206 | 0.283 | 0.149 | 0.235 | 0.219 |

| Example | 13 | 14 | 15 | 16 | 17 | 18 |
|---|---|---|---|---|---|---|
| $SiO_2$ | 61.14 | 61.47 | 61.13 | 61.11 | 61.32 | 61.10 |
| $Al_2O_3$ | 15.41 | 14.54 | 14.65 | 15.75 | 15.29 | 14.87 |
| $B_2O_3$ | 5.91 | 5.92 | 5.90 | 5.79 | 5.84 | 5.95 |
| $Li_2O$ | 9.96 | 9.92 | 10.00 | 9.24 | 9.35 | 9.96 |
| $Na_2O$ | 1.49 | 1.83 | 1.83 | 1.36 | 1.47 | 1.86 |
| $K_2O$ | 0.20 | 0.19 | 0.19 | 0.17 | 0.20 | 0.20 |
| CaO | 3.74 | 1.99 | 2.03 | 4.31 | 4.23 | 2.06 |

TABLE 1-continued

| | | | | | | |
|---|---|---|---|---|---|---|
| MgO | 1.92 | 1.92 | 1.94 | 2.01 | 1.99 | 1.98 |
| ZnO | — | — | — | — | — | — |
| SnO$_2$ | — | — | — | — | — | — |
| Fe$_2$O$_3$ | — | — | — | — | — | — |
| NiO | 0.0164 | — | — | 0.0215 | — | — |
| Co$_3$O$_4$ | — | — | — | — | 0.0025 | — |
| Cr$_2$O$_3$ | 0.0269 | — | — | 0.0270 | — | — |
| CuO | 0.1693 | — | — | 0.1761 | 0.2642 | — |
| CeO$_2$ | — | 0.20 | 0.21 | — | — | 0.42 |
| TiO$_2$ | 0.01 | 0.99 | 0.99 | 0.01 | 0.05 | 1.01 |
| R$_2$O | 11.65 | 11.94 | 12.02 | 10.77 | 11.02 | 12.02 |
| R'O | 5.66 | 3.91 | 3.97 | 6.32 | 6.22 | 4.04 |
| R$_2$O + R'O | 17.31 | 15.85 | 15.99 | 17.09 | 17.24 | 16.06 |
| NiO + Co$_3$O$_4$ + Cr$_2$O$_3$ + CuO | 0.213 | — | — | 0.225 | 0.267 | — |

| Example | 19 | 20 | 21 | 22 | 23 | 24 |
|---|---|---|---|---|---|---|
| SiO$_2$ | 61.18 | 61.42 | 61.39 | 61.04 | 58.63 | 59.17 |
| Al$_2$O$_3$ | 14.65 | 14.92 | 14.87 | 14.73 | 16.38 | 16.61 |
| B$_2$O$_3$ | 6.14 | 5.62 | 5.78 | 5.80 | 6.05 | 5.71 |
| Li$_2$O | 10.05 | 9.91 | 9.85 | 9.94 | 9.95 | 11.13 |
| Na$_2$O | 1.86 | 1.87 | 1.86 | 1.84 | 4.28 | 5.76 |
| K$_2$O | 0.19 | 0.20 | 0.20 | 0.19 | 0.20 | 0.19 |
| CaO | 2.02 | 2.06 | 2.06 | 2.03 | — | — |
| MgO | 1.94 | 1.99 | 1.97 | 1.95 | 0.04 | 0.02 |
| ZnO | — | — | — | — | 3.96 | 0.99 |
| SnO$_2$ | — | — | — | — | 0.01 | 0.01 |
| Fe$_2$O$_3$ | — | — | — | — | 0.0044 | 0.0040 |
| NiO | — | — | — | — | — | 0.0138 |
| Co$_3$O$_4$ | — | — | — | — | 0.0027 | 0.0024 |
| Cr$_2$O$_3$ | — | — | — | — | 0.0004 | 0.0258 |
| CuO | — | — | — | — | 0.3340 | 0.2233 |
| CeO$_2$ | 0.41 | 0.42 | 0.42 | 0.42 | — | — |
| TiO$_2$ | 1.00 | 1.02 | 1.02 | 1.01 | — | — |
| R$_2$O | 12.10 | 11.98 | 11.91 | 11.97 | 14.42 | 17.09 |
| R'O | 3.96 | 4.05 | 4.03 | 3.98 | 4.01 | 1.02 |
| R$_2$O + R'O | 16.06 | 16.03 | 15.94 | 15.95 | 18.43 | 18.11 |
| NiO + Co$_3$O$_4$ + Cr$_2$O$_3$ + CuO | — | — | — | — | 0.337 | 0.265 |

| Example | 25 | 26 | 27 | 28 | 29 | 30 |
|---|---|---|---|---|---|---|
| SiO$_2$ | 58.78 | 58.51 | 58.74 | 59.71 | 60.28 | 60.15 |
| Al$_2$O$_3$ | 16.52 | 16.52 | 16.30 | 16.46 | 16.48 | 15.79 |
| B$_2$O$_3$ | 5.95 | 6.06 | 6.09 | 5.95 | 6.08 | 6.14 |
| Li$_2$O | 10.91 | 10.50 | 10.05 | 10.45 | 10.24 | 8.95 |
| Na$_2$O | 5.23 | 4.77 | 4.27 | 4.78 | 4.29 | 1.41 |
| K$_2$O | 0.19 | 0.20 | 0.19 | 0.20 | 0.20 | 0.20 |
| CaO | — | — | — | — | — | — |
| MgO | 0.03 | 0.04 | 0.05 | 0.03 | 0.03 | 1.98 |
| ZnO | 2.00 | 3.01 | 3.92 | 1.99 | 2.00 | 5.01 |
| SnO$_2$ | 0.01 | 0.01 | 0.01 | 0.01 | 0.01 | 0.01 |
| Fe$_2$O$_3$ | 0.0044 | 0.0044 | 0.0044 | 0.0040 | 0.0044 | 0.0052 |
| NiO | 0.0147 | 0.0147 | 0.0146 | 0.0147 | 0.0147 | 0.0176 |
| Co$_3$O$_4$ | 0.0021 | 0.0024 | 0.0021 | 0.0021 | 0.0021 | 0.0001 |
| Cr$_2$O$_3$ | 0.0267 | 0.0267 | 0.0262 | 0.0263 | 0.0268 | 0.0291 |
| CuO | 0.1944 | 0.2130 | 0.2046 | 0.2305 | 0.2183 | 0.1987 |
| CeO$_2$ | — | — | — | — | — | — |
| TiO$_2$ | — | — | — | — | — | — |
| R$_2$O | 16.34 | 15.46 | 14.52 | 15.43 | 14.72 | 10.55 |
| R'O | 2.03 | 3.05 | 3.97 | 2.02 | 2.03 | 6.99 |
| R$_2$O + R'O | 18.37 | 18.51 | 18.49 | 17.45 | 16.75 | 17.55 |
| NiO + Co$_3$O$_4$ + Cr$_2$O$_3$ + CuO | 0.238 | 0.257 | 0.248 | 0.274 | 0.262 | 0.245 |

| Example | 31 | 32 | 33 | 34 | 35 |
|---|---|---|---|---|---|
| SiO$_2$ | 59.03 | 61.64 | 60.95 | 61.66 | 60.89 |
| Al$_2$O$_3$ | 16.35 | 15.05 | 15.44 | 15.11 | 15.61 |
| B$_2$O$_3$ | 5.85 | 5.87 | 5.80 | 5.94 | 6.12 |
| Li$_2$O | 11.86 | 12.03 | 9.78 | 11.97 | 9.49 |
| Na$_2$O | 6.32 | 3.93 | 1.56 | 3.94 | 1.52 |
| K$_2$O | 0.19 | 0.39 | 0.20 | 0.39 | 0.19 |
| CaO | — | — | 4.28 | 0.76 | 4.17 |
| MgO | 0.08 | 0.02 | 1.97 | 0.03 | 1.99 |
| ZnO | — | 0.75 | — | — | — |
| SnO$_2$ | — | 0.01 | — | — | — |
| Fe$_2$O$_3$ | 0.0132 | 0.0040 | 0.0068 | 0.0043 | 0.0068 |
| NiO | 0.0112 | 0.0116 | — | 0.0173 | — |

TABLE 1-continued

| | | | | | |
|---|---|---|---|---|---|
| $Co_3O_4$ | 0.0027 | 0.0118 | 0.0017 | 0.0025 | 0.0010 |
| $Cr_2O_3$ | 0.0274 | -0.0240 | 0.0034 | 0.0277 | — |
| CuO | 0.1659 | 0.1673 | — | 0.14 | — |
| $CeO_2$ | — | — | — | — | — |
| $TiO_2$ | — | — | 0.01 | 0.01 | 0.01 |
| $R_2O$ | 18.37 | 16.35 | 11.54 | 16.30 | 11.20 |
| R'O | 0.08 | 0.77 | 6.25 | 0.79 | 6.16 |
| $R_2O$ + R'O | 18.44 | 17.12 | 17.79 | 17.09 | 17.36 |
| NiO + $Co_3O_4$ + $Cr_2O_3$ + CuO | 0.207 | 0.205 | 0.005 | 0.185 | 0.001 |

Table 2 shows the dielectric constant (calculated) and dielectric constant (as measured at 10 GHz) for select examples from Table 1 at the indicated thickness. When calculated, the dielectric constant was calculated according to the following formula: $3.802946+0.01747*B_2O_3+0.058769*Al_2O_3+0.080876*Li_2O+0.148433*Na_2O+0.153264*K_2O+0.045179*MgO+0.080113*CaO$. Table 2 also shows the CIELAB coordinates for select samples from Table 1.

TABLE 2

| Example | 1 | 2 | 3 | 4 | 5 | 6 |
|---|---|---|---|---|---|---|
| Dk (relationship calculated) | 6.23 | 6.34 | 6.21 | 6.17 | 6.21 | 6.19 |
| Dk (measured at 10 GHz) | 6.13 | 6.23 | 6.18 | 6.15 | 6.19 | 6.29 |
| L* | — | — | — | — | — | — |
| a* | — | — | — | — | — | — |
| b* | — | — | — | — | — | — |
| Thickness (mm) | — | — | — | — | — | — |
| Example | 7 | 8 | 9 | 10 | 11 | 12 |
| Dk (relationship calculated) | 6.18 | 6.21 | 6.22 | 6.24 | 6.21 | 6.17 |
| Dk (measured at 10 GHz) | 6.21 | 6.22 | — | — | — | — |
| L* | — | 90.61 | 92.48 | 88.24 | 90.14 | 90.81 |
| a* | — | -8.02 | -4.39 | -1.61 | -8.48 | -7.43 |
| b* | — | 4.61 | -3.85 | -4.42 | 4.91 | 4.98 |
| Thickness (mm) | — | 1.32 | 1.38 | 1.36 | 1.38 | 1.34 |
| Example | 13 | 14 | 15 | 16 | 17 | 18 |
| Dk (relationship calculated) | 6.26 | 6.11 | 6.13 | 6.24 | 6.24 | 6.15 |
| Dk (measured at 10 GHz) | — | — | — | — | — | — |
| L* | 90.81 | 96.68 | 96.63 | 89.23 | 92.76 | 96.11 |
| a* | -7.6 | -0.4 | -0.39 | -7.87 | -4.26 | -1.36 |
| b* | 4.79 | 1.28 | 1.47 | 3.88 | -3.53 | 4.76 |
| Thickness (mm) | 1.34 | 1.34 | 1.34 | 1.32 | 1.37 | 1.34 |
| Example | 19 | 20 | 21 | 22 | 23 | 24 |
| Dk (relationship calculated) | 6.14 | 6.14 | 6.14 | 6.13 | 6.34 | 6.67 |
| Dk (measured at 10 GHz) | — | — | — | — | — | — |
| L* | 96.11 | 96.11 | 96.11 | 96.22 | — | — |
| a* | -1.36 | -1.36 | -1.36 | -1.3 | — | — |
| b* | 4.76 | 4.76 | 4.76 | 4.44 | — | — |
| Thickness (mm) | 1.34 | 1.34 | 1.34 | 1.36 | — | — |
| Example | 25 | 26 | 27 | 28 | 29 | 30 |
| Dk (relationship calculated) | 6.57 | 6.47 | 6.35 | 6.46 | 6.37 | 5.89 |
| Dk (measured at 10 GHz) | — | — | — | — | — | — |
| L* | — | — | — | — | — | — |
| a* | — | — | — | — | — | — |
| b* | — | — | — | — | — | — |
| Thickness (mm) | — | — | — | — | — | — |
| Example | 31 | 32 | 33 | 34 | 35 | |
| Dk (relationship calculated) | 6.80 | 6.41 | 5.95 | 6.41 | 5.94 | |
| Dk (measured at 10 GHz) | — | — | 6.23 | 6.41 | 6.24 | |
| L* | — | — | — | — | — | |
| a* | — | — | — | — | — | |
| b* | — | — | — | — | — | |
| Thickness (mm) | — | — | — | — | — | |

Table 3 shows the fracture toughness ($K_{IC}$) for select examples from Table 1 and a comparative example of a non-colored glass article comprising 58.5 mol % $SiO_2$, 17.8 mol % $Al_2O_3$, 6.0 mol % $B_2O_3$, 10.7 mol % $Li_2O$, 1.7 mol % $Na_2O$, 0.2 mol % $K_2O$, 4.5 mol % MgO, and 0.6 mol % CaO. The fracture toughness was measured using the chevron notch short bar (CNSB) method and the dual cantilever beam (DCB) method.

TABLE 3

| Example | $K_{IC}$ CNSB (MPa · $m^{1/2}$) | $K_{IC}$ DCB (MPa · $m^{1/2}$) |
|---|---|---|
| 31 | 0.774 | 0.816 |
| 8 | 0.8 | 0.839 |
| 32 | 0.794 | 0.813 |
| Comparative example | 0.786 | 0.877 |

Table 4 shows the ion exchange characteristics (CS, DOC, and CT) for select colored glass articles from Table 1 at different thicknesses and ion exchange conditions (temperature, time, and ion exchange bath compositions).

TABLE 4

| Example | Thickness (mm) | Temp (° C.) | Time (hrs.) | $KNO_3$ (wt %) | $NaNO_3$ (wt %) | $LiNO_3$ (wt %) | CS (MPa) | DOC (μm) | CT (MPa) |
|---|---|---|---|---|---|---|---|---|---|
| 23 | 0.6 | 440 | 6.5 | 79.2 | 19.4 | 1.4 | 599 | 5.62 | 104.67 |
| 24 | 0.6 | 430 | 4 | 79 | 19.4 | 1.6 | 633 | 6.02 | 129.51 |
| 25 | 0.6 | 430 | 4 | 79 | 19.4 | 1.6 | 661 | 5.03 | 124.41 |
| 26 | 0.6 | 430 | 4 | 79 | 19.4 | 1.6 | 700 | 3.83 | 119.67 |
| 27 | 0.6 | 430 | 4 | 79 | 19.4 | 1.6 | 684 | 3.97 | 117.14 |

TABLE 4-continued

| Example | Thickness (mm) | Temp (° C.) | Time (hrs.) | KNO3 (wt %) | NaNO3 (wt %) | LiNO3 (wt %) | CS (MPa) | DOC (μm) | CT (MPa) |
|---|---|---|---|---|---|---|---|---|---|
| 27 | 0.6 | 430 | 8 | 79 | 19.4 | 1.6 | 615 | 4.79 | 131.67 |
| 27 | 0.6 | 430 | 16 | 79 | 19.4 | 1.6 | 559 | 6.82 | 97.64 |
| 27 | 0.6 | 440 | 6 | 79 | 19.4 | 1.6 | 600 | 5.29 | 109.95 |
| 27 | 0.6 | 440 | 6 | 79.2 | 19.4 | 1.4 | 651 | 4.67 | 108.80 |
| 27 | 0.6 | 440 | 7 | 79.2 | 19.4 | 1.4 | 600 | 5.40 | 110.20 |
| 27 | 0.6 | 440 | 6.5 | 79.2 | 19.4 | 1.4 | 589 | 5.56 | 105.80 |
| 28 | 0.6 | 430 | 4 | 79 | 19.4 | 1.6 | 643 | 5.56 | 142.52 |
| 29 | 0.6 | 430 | 4 | 79 | 19.4 | 1.6 | 681 | 5.24 | 127.46 |
| 30 | 0.6 | 450 | 4 | 90 | 10 | 0 | 902 | 3.52 | 110 |
| 30 | 0.6 | 450 | 8 | 90 | 10 | 0 | 832 | 4.52 | 160 |
| 30 | 0.6 | 450 | 12 | 90 | 10 | 0 | 758 | 5.62 | 191 |
| 30 | 0.6 | 450 | 8 | 89 | 10 | 1 | 773 | 3.54 | 110 |
| 30 | 0.6 | 450 | 12 | 89 | 10 | 1 | 673 | 4.65 | 138 |
| 30 | 0.6 | 450 | 8 | 88.5 | 10 | 1.5 | 695 | 3.64 | 96 |
| 30 | 0.6 | 450 | 12 | 88.5 | 10 | 1.5 | 639 | 4.17 | 109 |
| 13 | 0.6 | 450 | 4 | 90 | 10 | 0 | 900 | 3.99 | 133 |
| 13 | 0.6 | 450 | 8 | 90 | 10 | 0 | 786 | 5.61 | 187 |
| 13 | 0.6 | 450 | 12 | 90 | 10 | 0 | 721 | 7.55 | 174 |
| 13 | 0.6 | 450 | 8 | 89 | 10 | 1 | 721 | 4.89 | 139 |
| 13 | 0.6 | 450 | 12 | 89 | 10 | 1 | 661 | 5.76 | 143 |
| 13 | 0.6 | 450 | 8 | 88.5 | 10 | 1.5 | 704 | 4.39 | 114 |
| 13 | 0.6 | 450 | 12 | 88.5 | 10 | 1.5 | 636 | 5.69 | 113 |
| 31 | 1.33 | 400 | 16 | 89 | 10 | 1 | 672 | 9.1 | 12 |
| 31 | 1.33 | 400 | 24 | 89 | 10 | 1 | 627 | 11.2 | 78 |
| 31 | 1.33 | 430 | 8 | 80 | 20 | 0 | 518 | 11.6 | 97 |
| 31 | 0.6 | 380 | 8 | 79 | 18.7 | 2.3 | 641 | 4.1 | 100 |
| 31 | 0.6 | 380 | 10 | 79 | 18.7 | 2.3 | 612 | 4.7 | 102 |
| 31 | 0.6 | 380 | 12 | 79 | 18.7 | 2.3 | 599 | 5.2 | 100 |
| 31 | 0.6 | 410 | 4 | 79 | 19.5 | 1.5 | 633 | 5.3 | 109 |
| 31 | 0.6 | 410 | 5 | 79 | 19.5 | 1.5 | 612 | 5.9 | 108 |
| 31 | 0.6 | 410 | 6 | 79 | 19.5 | 1.5 | 601 | 6.1 | 107 |
| 31 | 0.6 | 400 | 5 | 79 | 19.8 | 1.2 | 695 | 5.0 | 112 |
| 31 | 0.6 | 400 | 5 | 79 | 20.1 | 0.9 | 671 | 5.3 | 116 |
| 31 | 0.6 | 400 | 5 | 79 | 19.4 | 1.6 | 645 | 5.0 | 107 |
| 31 | 0.6 | 430 | 2.5 | 79 | 19.4 | 1.6 | 591 | 6.0 | 101 |
| 31 | 0.6 | 430 | 3 | 79 | 19.4 | 1.6 | 569 | 6.1 | 98 |
| 31 | 0.6 | 430 | 3.5 | 79 | 19.4 | 1.6 | 557 | 6.8 | 96 |
| 31 | 0.6 | 430 | 2.5 | 75.6 | 24 | 0.4 | 609 | 6.41 | 126 |
| 31 | 0.6 | 430 | 2.5 | 76 | 24 | 0 | 602 | 7.57 | 129 |
| 31 | 0.55 | 400 | 3 | 79 | 19.8 | 1.2 | 749 | 3.69 | 108 |
| 8 | 0.6 | 450 | 4 | 89.8 | 10 | 0.2 | 693 | 5.54 | 139 |
| 8 | 0.6 | 450 | 4 | 89.8 | 10 | 0.2 | 637 | 7.54 | 134 |
| 8 | 0.6 | 450 | 8 | 89.5 | 10 | 0.5 | 664 | 5.56 | 134 |
| 8 | 0.6 | 450 | 8 | 88.5 | 11 | 0.5 | 661 | 5.59 | 138 |
| 8 | 0.6 | 450 | 8 | 87.5 | 12 | 0.5 | 645 | 5.69 | 142 |
| 8 | 0.6 | 450 | 8 | 86.5 | 13 | 0.5 | 636 | 5.74 | 145 |
| 8 | 0.6 | 450 | 8 | 89.5 | 10 | 0.5 | 667 | 5.52 | 136 |
| 8 | 0.55 | 450 | 6.75 | 87.3 | 12.5 | 0.2 | 668 | 5.64 | 140 |
| 8 | 0.55 | 450 | 6.75 | 87.5 | 12.5 | 0 | 686 | 5.63 | 157 |
| 8 | 0.6 | 440 | 8 | 88 | 11 | 1 | 667 | 4.32 | 121 |
| 8 | 0.6 | 440 | 10 | 88 | 11 | 1 | 638 | 5.10 | 127 |
| 8 | 0.6 | 440 | 12 | 88 | 11 | 1 | 614 | 5.64 | 129 |

Figure 5:
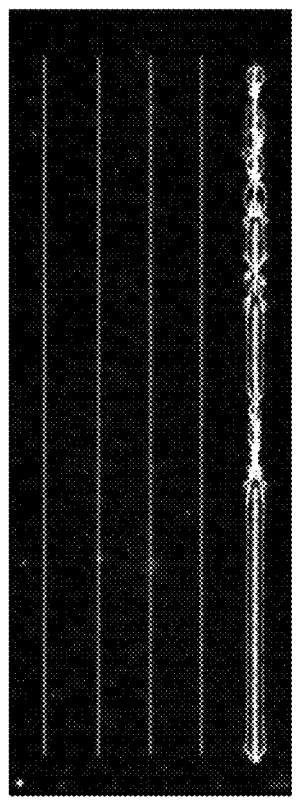
FIG. 5 shows resulting microductile cracking of Knoop Scratch Threshold testing for a select inventive example.
Figure 6:
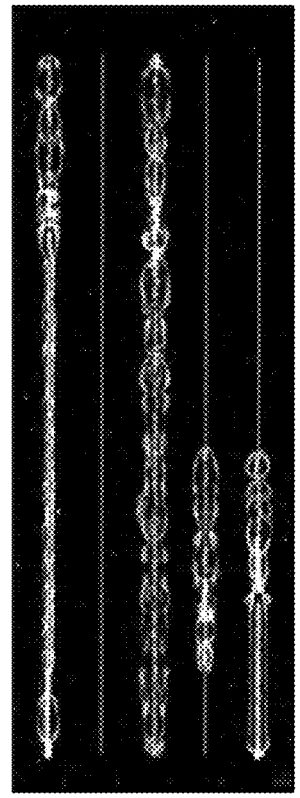
FIG. 6 shows resulting lateral cracking of Knoop Scratch Threshold testing for a select inventive example.
Figure 7:
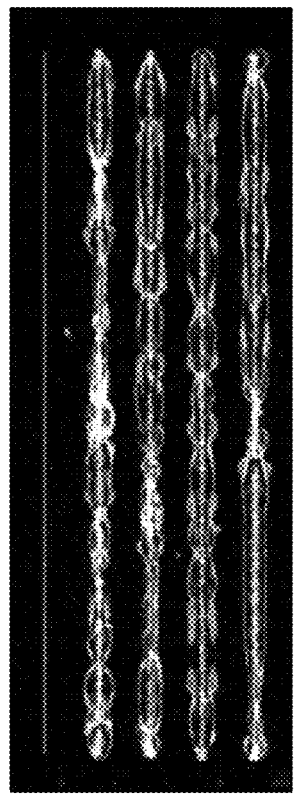
FIG. 7 shows resulting microductile cracking of Knoop Scratch Threshold testing for a select inventive example.
Figure 8:
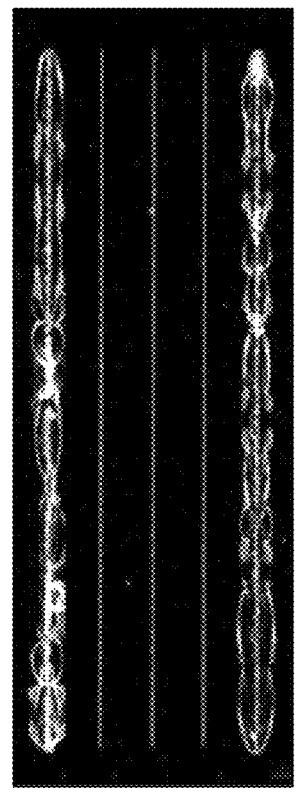
FIG. 8 shows resulting lateral cracking of Knoop Scratch Threshold testing for a select inventive example.

Referring now to FIGS. 5-8, example colored glass article 8, having a thickness of 0.6 mm and strengthened in an ion-exchange bath of 89.3 wt % KNO3, 10 wt % NaNO3, and 0.7 wt % LiNO3 at 400° C. for 9 hours, was subjected to Knoop Scratch Threshold testing with a load of 5N as shown in FIGS. 5 and 6 and a load of 8N as shown in FIGS. 7 and 8. The Knoop Scratch Threshold testing was completed using a Bruker UMT (universal mechanical tester) with a knoop geometry diamond tip from Gilmore Diamonds. The tip was loaded into the material at a rate of 0.14 N/s to the desired load of 5N or 8N, at which point the tip was dragged laterally through the material at a rate of 9.34 mm/min. From there, the diamond tip was unloaded at a rate of 0.14 N/s.

Figure 9:
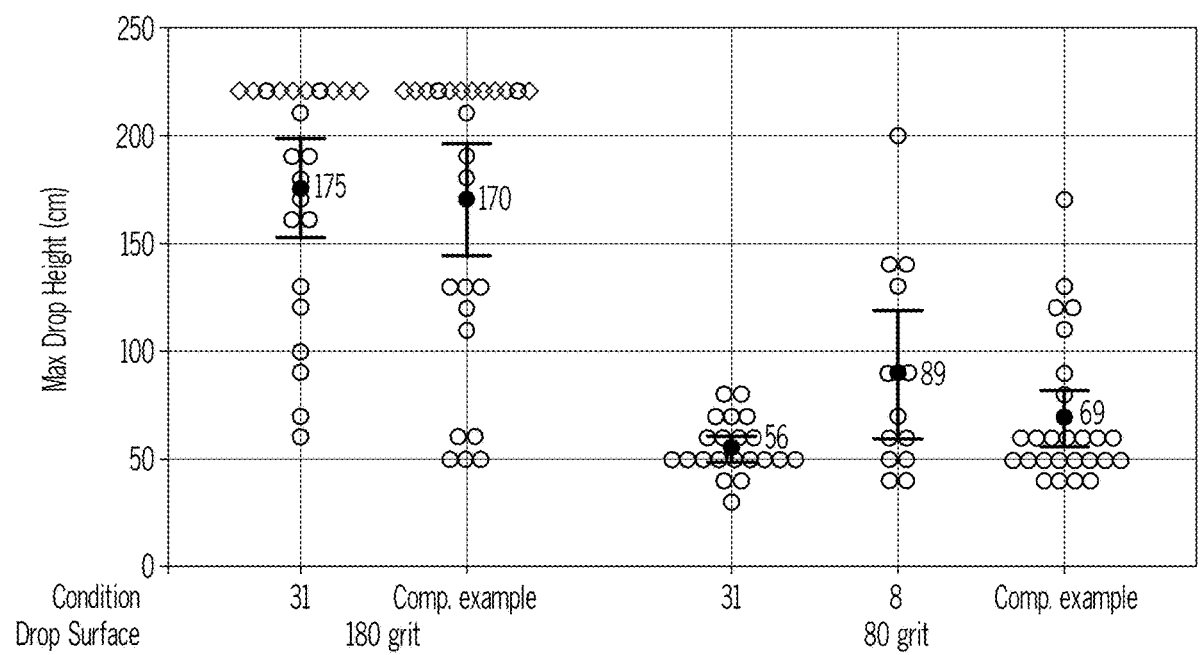
FIG. 9 graphically depicts the results of an incremental face drop on sandpaper (i.e., a "drop test") for select inventive examples and a comparative example.

Referring now to FIG. 9, the results of an incremental face drop on sandpaper (i.e., a "drop test") for two different sandpaper conditions (180 grit and 80 grit) are shown for Examples 8 and 31 and a comparative example of a non-colored glass article comprising 58.5 mol % SiO2, 17.8 mol % Al2O3, 6.0 mol % B2O3, 10.7 mol % Li2O, 1.7 mol % Na2O, 0.2 mol % K2O, 4.5 mol % MgO, and 0.6 mol % CaO. Prior to performing the drop test, Example 31 was ion exchanged in a molten salt batch comprising 89.3 wt % KNO3, 10 wt % NaNO3, and 0.7 wt % LiNO3 at 440° C. for 9 hours. Example 8 was ion exchanged in a molten salt batch comprising 79 wt % KNO3, 19.9 wt % NaNO3, and 1.6 wt % LiNO3 at 400° C. for 5 hours. The comparative example was ion exchanged in a molten salt batch comprising 90.3 wt % KNO3, 9 wt % NaNO3, and 0.7 wt % LiNO3 at 450° C. for 5 hours.

The circles in FIG. 9 indicate at what height the sample fractured. The diamonds represent samples that were dropped incrementally all the way to 220 cm and did not fracture. As exemplified by FIG. 9, Examples 8 and 31, colored glass articles, exhibited similar drop performance as compared to a comparative example of a non-colored glass article.

Figure 10:
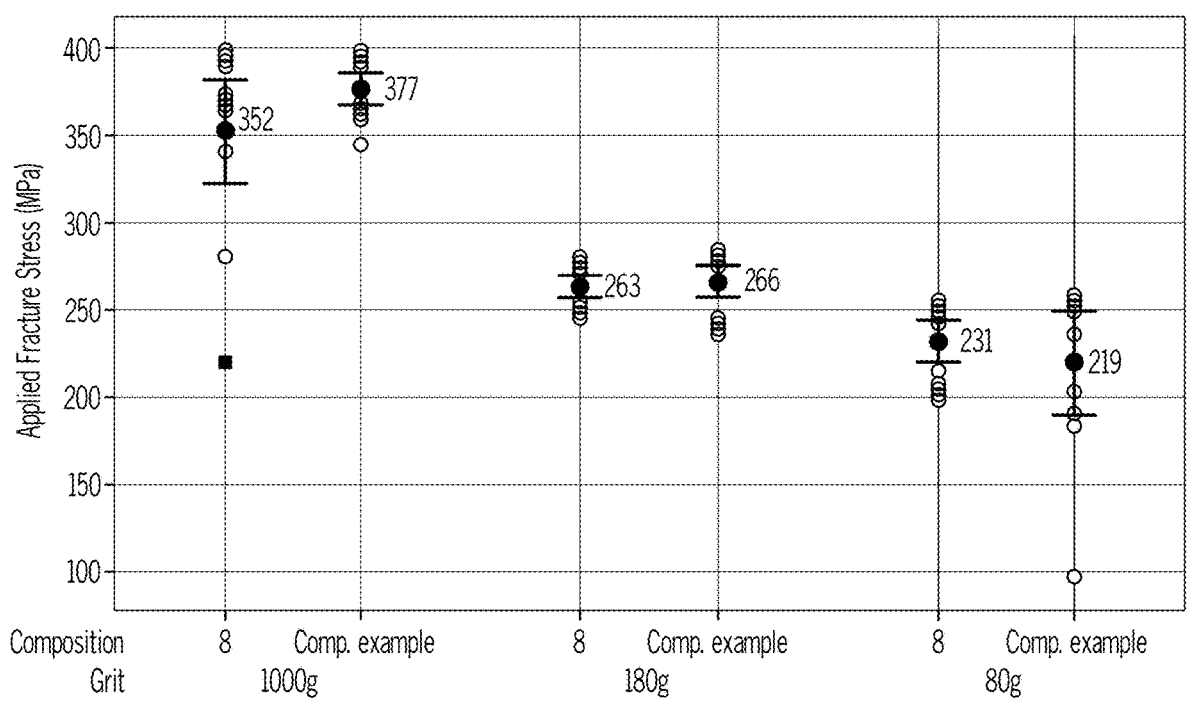
FIG. 10 graphically depicts the results of four-point break testing after damage with sandpaper (i.e., a "slapper test") for a select inventive example and a comparative example.

Referring now to FIG. 10, the results of four point break testing after damage with sandpaper (i.e., a "slapper test") for three different sandpaper conditions (1000 grit, 180 grit, and 80 grit) are shown for Example 8 and a comparative example of a non-colored glass article comprising 58.5 mol % $SiO_2$, 17.8 mol % $Al_2O_3$, 6.0 mol % $B_2O_3$, 10.7 mol % $Li_2O$, 1.7 mol % $Na_2O$, 0.2 mol % $K_2O$, 4.5 mol % MgO, and 0.6 mol % CaO. For the slapper test, samples of Example 8 and the comparative example were loaded onto a puck and slapped onto sandpaper having the identified grit using a particular force. The samples were not fractured, but were damaged after the sandpaper impact. The sample was then loaded into 4 point bending and the applied stress was incrementally increased until the sample broke. The applied stress at fracture is shown in FIG. 10. Prior to performing the slapper test, Example 8 was ion exchanged in a molten salt batch comprising 79 wt % $KNO_3$, 19.9 wt % $NaNO_3$, and 1.6 wt % $LiNO_3$ at 400° C. for 5 hours. The comparative example was ion exchanged in a molten salt batch comprising 90.3 wt % $KNO_3$, 9 wt % $NaNO_3$, and 0.7 wt % $LiNO_3$ at 450° C. for 5 hours. As exemplified by FIG. 10, Example 8, a colored glass article, exhibited similar slapper test results as compared to a comparative example of a non-colored glass article.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A colored glass back cover for an electronic device, comprising:
   $B_2O_3$, $Al_2O_3$, $Li_2O$, $Na_2O$, $K_2O$, MgO, and CaO in mol % amounts such that $(3.802946+0.01747*B_2O_3+0.058769*Al_2O_3+0.080876*Li_2O+0.148433*Na_2O+0.153264*K_2O+0.045179*MgO+0.080113*CaO)$ is less than or equal to 6.8 and greater than or equal to 5.7, and wherein a sum of ($R_2O$+R'O) in mol % is less than or equal to 25 mol %, where $R_2O$ is a sum of alkali metal oxides $Li_2O$, $Na_2O$, and $K_2O$ in mol % of the glass of the colored glass back cover and R'O is a sum of ZnO and alkaline earth metal oxides CaO and MgO in mol %, thereby facilitating dielectric properties for use of the colored glass back cover in high frequency applications;
   wherein the $Al_2O_3$ is greater than or equal to 10 mol % and less than or equal to 20 mol %, and a difference of ($R_2O-Al_2O_3$) in mol % is greater than or equal to −8 mol % and less than or equal to 4 mol %, thereby controlling formation of non-bridging oxygen, wherein $K_{IC}$ fracture toughness of the glass of the colored glass back cover as measured by a chevron notch short bar method is greater than or equal to 0.7 MPa·m$^{1/2}$;
   wherein the glass of the colored glass back cover further comprises transition metal oxides and/or rare earth oxides colorants of NiO, $Co_3O_4$, $Cr_2O_3$, CuO, $CeO_2$, $TiO_2$ and/or combinations thereof such that a sum of ($NiO+Co_3O_4+Cr_2O_3+CuO+CeO_2+TiO_2$) in mol % is greater than or equal to 0.001 mol % and less than or equal to 10 mol %, and the glass of the colored glass back cover falls within a CIELAB color space, as measured at an article thickness of 1.33 mm under F2 illumination and a 10° standard observer angle, of L* greater than or equal to 65 and less than or equal to 98, absolute value of a* greater than or equal to 0.3, and absolute value of b* greater than or equal to 0.5; and
   wherein the $Na_2O$ of the glass of the colored glass back cover is greater than 0 mol % and less than or equal to 8 mol %, and the $K_2O$ is greater than 0 mol % and less than or equal to 1 mol %, thereby facilitating ion-exchange, wherein the colored glass back cover has a depth of compression of 10 μm or greater, a surface compressive stress greater than or equal to 300 MPa, and a central tension greater than or equal to 40 MPa.

2. The colored glass back cover of claim 1, wherein the depth of compression is greater than or equal to 0.15t and less than or equal to 0.3t, where "t" is a thickness of the colored glass back cover, and wherein the thickness is greater than or equal to 250 μm and less than or equal to 6 mm.

3. The colored glass back cover of claim 1, wherein the sum of ($R_2O$+R'O) in mol % is greater than or equal to 7 mol %, and wherein the R'O is greater than 4 mol % and less than or equal to 10 mol %.

4. The colored glass back cover of claim 1, wherein $(3.802946+0.01747*B_2O_3+0.058769*Al_2O_3+0.080876*Li_2O+0.148433*Na_2O+0.153264*K_2O+0.045179*MgO+0.080113*CaO)$ is greater than 6.1.

5. The colored glass back cover of claim 1, wherein the sum of ($NiO+Co_3O_4+Cr_2O_3+CuO+CeO_2+TiO_2$) in mol % is greater than or equal to 0.001 mol % and less than or equal to 3 mol %.

6. The colored glass back cover of claim 1, wherein the glass of the colored glass back cover falls within the CIELAB color space, as measured at an article thickness of 1.33 mm under F2 illumination and a 10° standard observer angle, of a* greater than or equal to −20 and less than or equal to 10, and b* greater than or equal to −15 and less than or equal to 15.

7. A colored glass back cover for an electronic device, comprising:
   $B_2O_3$, $Al_2O_3$, $Li_2O$, $Na_2O$, $K_2O$, MgO, and CaO in mol % amounts such that $(3.802946+0.01747*B_2O_3+0.058769*Al_2O_3+0.080876*Li_2O+0.148433*Na_2O+0.153264*K_2O+0.045179*MgO+0.080113*CaO)$ is less than or equal to 6.8 and greater than or equal to 5.7, and wherein a sum of ($R_2O$+R'O) in mol % is less than or equal to 25 mol %, where $R_2O$ is a sum of alkali metal oxides $Li_2O$, $Na_2O$, and $K_2O$ in mol % of the glass of the colored glass back cover and R'O is a sum of ZnO and alkaline earth metal oxides CaO and MgO in mol %, thereby facilitating dielectric properties for use of the colored glass back cover in high frequency applications;
   wherein the $B_2O_3$ is greater than or equal to 1 mol % and less than or equal to 10 mol %, and a difference of ($R_2O-Al_2O_3$) in mol % is greater than or equal to −8 mol % and less than or equal to 4 mol %, thereby controlling formation of non-bridging oxygen, wherein $K_{IC}$ fracture toughness of the glass of the colored glass back cover as measured by a chevron notch short bar method is greater than or equal to 0.7 MPa·m$^{1/2}$;
   wherein the glass of the colored glass back cover further comprises transition metal oxides and/or rare earth oxides colorants of NiO, $Co_3O_4$, $Cr_2O_3$, CuO, $CeO_2$, $TiO_2$ and/or combinations thereof such that a sum of ($NiO+Co_3O_4+Cr_2O_3+CuO+CeO_2+TiO_2$) in mol % is greater than or equal to 0.001 mol % and less than or equal to 10 mol %, and the glass of the colored glass back cover falls within a CIELAB color space, as measured at an article thickness of 1.33 mm under F2 illumination and a 10° standard observer angle, of L* greater than or equal to 65 and less than or equal to 98, absolute value of a* greater than or equal to 0.3, and absolute value of b* greater than or equal to 0.5; and wherein the $Na_2O$ of the glass of the colored glass back cover is greater than 0 mol % and less than or equal to 8 mol %, and the $K_2O$ is greater than 0 mol % and less than or equal to 1 mol %, thereby facilitating ion-exchange, wherein the colored glass back cover has a depth of compression of 10 μm or greater, a surface compressive stress greater than or equal to 300 MPa, and a central tension greater than or equal to 40 MPa.

8. The colored glass back cover of claim 7, wherein the depth of compression is greater than or equal to 0.15t and less than or equal to 0.3t, where "t" is a thickness of the colored glass back cover, and wherein the thickness is greater than or equal to 250 μm and less than or equal to 6 mm.

9. The colored glass back cover of claim 7, wherein the sum of ($R_2O+R'O$) in mol % is greater than or equal to 7 mol %, and wherein the R'O is greater than 4 mol % and less than or equal to 10 mol %.

10. The colored glass back cover of claim 7, wherein (3.802946+0.01747*$B_2O_3$+0.058769*$Al_2O_3$+ 0.080876*$Li_2O$+0.148433*$Na_2O$+0.153264*$K_2O$+ 0.045179*MgO+0.080113*CaO) is greater than 6.1.

11. The colored glass back cover of claim 7, wherein the sum of ($NiO+Co_3O_4+Cr_2O_3+CuO+CeO_2+TiO_2$) in mol % is greater than or equal to 0.001 mol % and less than or equal to 3 mol %.

12. The colored glass back cover of claim 7, wherein the glass of the colored glass back cover falls within the CIELAB color space, as measured at an article thickness of 1.33 mm under F2 illumination and a 10° standard observer angle, of a* greater than or equal to −20 and less than or equal to 10, and b* greater than or equal to −15 and less than or equal to 15.

13. A colored glass back cover for an electronic device, comprising:
$B_2O_3$, $Al_2O_3$, $Li_2O$, $Na_2O$, $K_2O$, MgO, and CaO in mol % amounts such that (3.802946+0.01747*$B_2O_3$+ 0.058769*$Al_2O_3$+0.080876*$Li_2O$+0.148433*$Na_2O$+ 0.153264*$K_2O$+0.045179*MgO+0.080113*CaO) is less than or equal to 6.8 and greater than or equal to 5.7, and wherein a sum of ($R_2O+R'O$) in mol % is less than or equal to 25 mol %, where $R_2O$ is a sum of alkali metal oxides $Li_2O$, $Na_2O$, and $K_2O$ in mol % of the glass of the colored glass back cover and R'O is a sum of ZnO and alkaline earth metal oxides CaO and MgO in mol %, thereby facilitating dielectric properties for use of the colored glass back cover in high frequency applications;
wherein the $Al_2O_3$ is greater than or equal to 10 mol % and less than or equal to 20 mol %, the $B_2O_3$ is greater than or equal to 1 mol % and less than or equal to 10 mol %, and a difference of ($R_2O-Al_2O_3$) in mol % is greater than or equal to −8 mol % and less than or equal to 4 mol %, thereby controlling formation of non-bridging oxygen, wherein $K_{IC}$ fracture toughness of the glass of the colored glass back cover as measured by a chevron notch short bar method is greater than or equal to 0.7 MPa·m$^{1/2}$;
wherein the glass of the colored glass back cover further comprises transition metal oxides and/or rare earth oxides colorants of NiO, $Co_3O_4$, $Cr_2O_3$, CuO, $CeO_2$, $TiO_2$ and/or combinations thereof such that a sum of ($NiO+Co_3O_4+Cr_2O_3+CuO+CeO_2+TiO_2$) in mol % is greater than or equal to 0.001 mol % and less than or equal to 10 mol %, and the glass of the colored glass back cover falls within a CIELAB color space, as measured at an article thickness of 1.33 mm under F2 illumination and a 10° standard observer angle, of L* greater than or equal to 65 and less than or equal to 98, absolute value of a* greater than or equal to 0.3, and absolute value of b* greater than or equal to 0.5; and
wherein the $Na_2O$ of the glass of the colored glass back cover is greater than 0 mol % and less than or equal to 8 mol %, thereby facilitating ion-exchange, wherein the colored glass back cover has a depth of compression of 10 μm or greater, a surface compressive stress greater than or equal to 300 MPa, and a central tension greater than or equal to 40 MPa.

14. The colored glass back cover of claim 13, wherein the depth of compression is greater than or equal to 0.15t and less than or equal to 0.3t, where "t" is a thickness of the colored glass back cover, and wherein the thickness is greater than or equal to 250 μm and less than or equal to 6 mm.

15. The colored glass back cover of claim 13, wherein the sum of ($R_2O+R'O$) in mol % is greater than or equal to 7 mol %, and wherein the R'O is greater than 4 mol % and less than or equal to 10 mol %.

16. The colored glass back cover of claim 13, wherein (3.802946+0.01747*$B_2O_3$+0.058769*$Al_2O_3$+ 0.080876*$Li_2O$+0.148433*$Na_2O$+0.153264*$K_2O$+ 0.045179*MgO+0.080113*CaO) is greater than 6.1.

17. The colored glass back cover of claim 13, wherein the sum of ($NiO+Co_3O_4+Cr_2O_3+CuO+CeO_2+TiO_2$) in mol % is greater than or equal to 0.001 mol % and less than or equal to 3 mol %.

18. The colored glass back cover of claim 13, wherein the glass of the colored glass back cover falls within the CIELAB color space, as measured at an article thickness of 1.33 mm under F2 illumination and a 10° standard observer angle, of a* greater than or equal to −20 and less than or equal to 10, and b* greater than or equal to −15 and less than or equal to 15.

19. A colored glass back cover for an electronic device, comprising:
$B_2O_3$, $Al_2O_3$, $Li_2O$, $Na_2O$, $K_2O$, MgO, and CaO in mol % amounts such that (3.802946+0.01747*$B_2O_3$+ 0.058769*$Al_2O_3$+0.080876*$Li_2O$+0.148433*$Na_2O$+ 0.153264*$K_2O$+0.045179*MgO+0.080113*CaO) is less than or equal to 6.8 and greater than or equal to 5.7, and wherein a sum of ($R_2O+R'O$) in mol % is less than or equal to 25 mol %, where $R_2O$ is a sum of alkali metal oxides $Li_2O$, $Na_2O$, and $K_2O$ in mol % of the glass of the colored glass back cover and R'O is a sum of ZnO and alkaline earth metal oxides CaO and MgO in mol %, thereby facilitating dielectric properties for use of the colored glass back cover in high frequency applications;
wherein the $Al_2O_3$ is greater than or equal to 10 mol % and less than or equal to 20 mol %, the $B_2O_3$ is greater than or equal to 1 mol % and less than or equal to 10 mol %, and a difference of ($R_2O-Al_2O_3$) in mol % is greater than or equal to −8 mol % and less than or equal to 4 mol %, thereby controlling formation of non-bridging oxygen, wherein $K_{IC}$ fracture toughness of the glass of the colored glass back cover as measured by a chevron notch short bar method is greater than or equal to 0.7 MPa·m$^{1/2}$;
wherein the glass of the colored glass back cover further comprises transition metal oxides and/or rare earth oxides colorants of NiO, $Co_3O_4$, $Cr_2O_3$, CuO, $CeO_2$, $TiO_2$ and/or combinations thereof such that a sum of ($NiO+Co_3O_4+Cr_2O_3+CuO+CeO_2+TiO_2$) in mol % is greater than or equal to 0.001 mol % and less than or equal to 10 mol %, and the glass of the colored glass back cover falls within a CIELAB color space, as measured at an article thickness of 1.33 mm under F2 illumination and a 10° standard observer angle, of L* greater than or equal to 65 and less than or equal to 98, absolute value of a* greater than or equal to 0.3, and absolute value of b* greater than or equal to 0.5; and wherein the $K_2O$ is greater than 0 mol % and less than or equal to 1 mol %, thereby facilitating ion-exchange, wherein the colored glass back cover has a depth of compression of 10 μm or greater, a surface compressive stress greater than or equal to 300 MPa, and a central tension greater than or equal to 40 MPa.

20. The colored glass back cover of claim 19, wherein the depth of compression is greater than or equal to 0.15t and less than or equal to 0.3t, where "t" is a thickness of the colored glass back cover, and wherein the thickness is greater than or equal to 250 μm and less than or equal to 6 mm.

21. The colored glass back cover of claim 19, wherein the sum of ($R_2O+R'O$) in mol % is greater than or equal to 7 mol %, and wherein the R'O is greater than 4 mol % and less than or equal to 10 mol %.

22. The colored glass back cover of claim 19, wherein ($3.802946+0.01747*B_2O_3+0.058769*Al_2O_3+0.080876*Li_2O+0.148433*Na_2O+0.153264*K_2O+0.045179*MgO+0.080113*CaO$) is greater than 6.1.

23. The colored glass back cover of claim 19, wherein the sum of ($NiO+CO_3O_4+Cr_2O_3+CuO+CeO_2+TiO_2$) in mol % is greater than or equal to 0.001 mol % and less than or equal to 3 mol %.

24. The colored glass back cover of claim 19, wherein the glass of the colored glass back cover falls within the CIELAB color space, as measured at an article thickness of 1.33 mm under F2 illumination and a 10° standard observer angle, of a* greater than or equal to −20 and less than or equal to 10, and b* greater than or equal to −15 and less than or equal to 15.

* * * * *

UNITED STATES PATENT AND TRADEMARK OFFICE
CERTIFICATE OF CORRECTION

PATENT NO. : 11,834,370 B2
APPLICATION NO. : 18/093090
DATED : December 5, 2023
INVENTOR(S) : Xiaoju Guo et al.

It is certified that error appears in the above-identified patent and that said Letters Patent is hereby corrected as shown below:

On the Title Page

On the Page 2, in Column 2, item (56) under "Foreign Patent Documents", Line 20, delete "7/2013" and insert -- 4/2013 --.

On the Page 3, in Column 1, under item (56) "Other Publications", Line 2, delete "Retreived" and insert -- Retrieved --.

On the Page 3, in Column 1, under item (56) "Other Publications", Line 5, delete "Retreived" and insert -- Retrieved --.

On the Page 3, in Column 1, under item (56) "Other Publications", Line 8, delete "Retreived" and insert -- Retrieved --.

On the Page 3, in Column 1, under item (56) "Other Publications", Line 10, delete "Retreived" and insert -- Retrieved --.

On the Page 3, in Column 1, under item (56) "Other Publications", Line 26, delete "L-iquidus" and insert -- Liquidus --.

In the Claims

In Column 46, Line 11, in Claim 23, delete "$CO_3O_4$" and insert -- $Co_3O_4$ --.

Signed and Sealed this
Seventeenth Day of December, 2024

Derrick Brent
*Acting Director of the United States Patent and Trademark Office*